United States Patent
Campbell

(10) Patent No.: US 9,036,465 B2
(45) Date of Patent: May 19, 2015

(54) HIERARCHICAL NETWORK WITH ACTIVE REDUNDANT LINKS

(71) Applicant: Allied Telesis Holdings Kabushiki Kaisha, Tokyo (JP)

(72) Inventor: Graeme K Campbell, Christchurch (NZ)

(73) Assignee: ALLIED TELESIS HOLDINGS KABUSHIKI KAISHA, Tokyo (JP)

( * ) Notice: Subject to any disclaimer, the term of this patent is extended or adjusted under 35 U.S.C. 154(b) by 193 days.

(21) Appl. No.: 13/754,441

(22) Filed: Jan. 30, 2013

(65) Prior Publication Data

US 2014/0036661 A1 Feb. 6, 2014

Related U.S. Application Data

(60) Provisional application No. 61/592,364, filed on Jan. 30, 2012.

(51) Int. Cl.
| H04L 12/24 | (2006.01) |
| H04L 12/715 | (2013.01) |
| H04L 12/707 | (2013.01) |
| H04L 12/703 | (2013.01) |

(52) U.S. Cl.
CPC ............ *H04L 41/12* (2013.01); *H04L 41/0893* (2013.01); *H04L 45/04* (2013.01); *H04L 45/22* (2013.01); *H04L 45/28* (2013.01); *H04L 41/0654* (2013.01)

(58) Field of Classification Search
CPC ..... H04L 41/12; H04L 41/0654; H04L 45/28; H04L 45/22; H04L 45/04; H04L 41/0893
USPC .......................... 370/228, 216, 217, 218, 219
See application file for complete search history.

(56) References Cited

U.S. PATENT DOCUMENTS

| 6,990,111 B2* | 1/2006 | Lemoff et al. ................. 370/400 |
| 2003/0131311 A1 | 7/2003 | McNamara |
| 2004/0184441 A1 | 9/2004 | Wu et al. |
| 2005/0259595 A1 | 11/2005 | Preguica |
| 2006/0038688 A1 | 2/2006 | Nakamura |
| 2008/0126857 A1 | 5/2008 | Basham |
| 2009/0041037 A1 | 2/2009 | Yang et al. |
| 2010/0061231 A1* | 3/2010 | Harmatos et al. ............. 370/228 |
| 2010/0306352 A1 | 12/2010 | Pritikin |
| 2011/0019534 A1 | 1/2011 | Ramakrishnan et al. |

FOREIGN PATENT DOCUMENTS

| EP | 0841824 A2 | 5/1998 |
| KR | 2002-0038880 A | 5/2002 |
| WO | 2005053178 A1 | 6/2005 |

* cited by examiner

*Primary Examiner* — Mohammad Anwar

(57) ABSTRACT

A hierarchical structure network of devices is formed. A group of devices may be grouped together to form a domain. A plurality of domains formed in a hierarchical structure forms a hierarchical network. Traffic flow topology may be updated only within the same domain that topology changes. In one embodiment, traffic flow topology is updated only in a parent domain and a child domain when the status of a link connecting the two domain changes. Thus, other domains within the network have no need to update the traffic flow topology and remain agnostic to the traffic flow updates. Thus, responsiveness of the network to topology changes is improved. Multiple links may each carry traffic if multiple links exist between nodes. As such, a network of robust redundant interconnections with active links is formed that react quickly to network topology changes and that uses the interconnection links in an efficient manner.

20 Claims, 16 Drawing Sheets

HIERARCHICAL NETWORK WITH ACTIVE REDUNDANT LINKS

RELATED APPLICATIONS

This application claims the benefit of and priority to the U.S. provisional patent application No. 61/592,364, filed on Jan. 30, 2012, by the same inventor, Graeme Keith Campbell.

BACKGROUND

Networks utilizing traditional protocols, e.g., spanning tree protocol (STP), rapid spanning tree protocol (RSTP), multiple spanning tree protocol (MSTP), etc., are generally slow to react to a change in network topology. Furthermore, such protocols generally block all but one interconnection to a node. As such, traditional protocols are not only slow to react to topology changes but waste valuable interconnection bandwidth.

Alternative conventional systems, e.g., Ethernet Protection Switching Ring (EPSR), may respond faster to topology changes, e.g., node failure, link failure, etc., in comparison to spanning tree protocols. Unfortunately, EPSR is limited to ring topologies and is therefore limited in its application.

SUMMARY

Accordingly, a need has arisen to create a network that is configured to react quickly to topology changes within the network without being bandwidth limited or limited to ring topologies. For example, there is a need to create a network that can resolve and update data flow traffic as fast as possible while allowing its interconnection links between nodes, e.g., devices, to remain active and carry traffic.

According to one embodiment, devices (also referred to as nodes) are formed in a hierarchical network structure. For example, a group of devices may be grouped together to form a domain. A plurality of domains formed in a hierarchical structure forms a hierarchical network.

According to one embodiment, traffic flow topology is updated only within the same domain where the topology has changed, e.g., link failure, link up, etc. In other words, other domains within the network have no need to update the traffic flow topology, thereby improving responsiveness of the network to topology changes while allowing all interconnections between nodes to carry traffic. In one embodiment, traffic flow topology is updated only in a parent domain and a child domain when the status of a link connecting the two domain changes, e.g., link failure, link up, link down, link added by introducing a new node within one of the domains, etc. In other words, other domains within the network have no need to update the traffic flow topology, thereby improving responsiveness of the network to topology changes while allowing all interconnections between nodes to carry traffic. As such, a network of robust redundant interconnections with active links is formed that reacts quickly to network topology changes and that uses the interconnection links in an efficient manner.

In one embodiment, a method includes forming a core domain in a network and grouping a plurality of devices to form a plurality of domains within the network. It is appreciated that the core domain includes a device. According to one embodiment the core domain and the plurality of domains are formed in a hierarchical structure to form at least two data paths between two devices of the network. The core domain is at a top of the hierarchical structure and the at least two data paths carry data between the two devices in absence of a failure associated with a data path of the at least two data paths. In one embodiment, a first data path of the at least two data paths is a redundant data path that carries data between the two devices in response to the failure associated with a second data path of the at least two data paths.

It is appreciated that the failure may be a link failure. The method may further include updating data traffic flow topology in the first domain in response to a change in a first domain of the network. It is appreciated that domains in the network other than the first domain remain agnostic to the updating. According to one embodiment, the change is a change in link status coupling two devices in the first domain, and wherein the updating is in response to a message generated by a device within the first domain.

In one embodiment, the method further includes updating data traffic flow topology in said first domain and further in said child domain in response to a link status change, wherein the link connects a first domain of the network to its child domain. The child domain is one hierarchical level further from the core domain in comparison to the first domain. It is appreciated that domains of the network other than the first domain and the child domain remain agnostic to the updating.

The updating may occur in response to a message generated by a device in the parent domain or in the child domain. It is appreciated that any child domain within the network receives data only from one parent domain in the network and that a parent domain is one hierarchical level closer to the core domain in comparison to the child domain.

The method may further include communicating device information between devices grouped in a same domain and communicating domain information between each parent and child domain. The device information includes information about devices within the same domain and links coupling the devices grouped in the same domain to one another. It is appreciated that domains within the network other than each parent and child domains remain agnostic to the domain information, wherein the parent domain is a domain that is only one hierarchical level closer to the core domain in comparison to the child domain.

According to one embodiment a system includes a core domain in a network and a plurality of domains formed within the network. The core domain includes a device and each domain of the plurality of domains comprises at least one device. According to one embodiment the core domain and the plurality of domains are formed in a hierarchical structure to form at least two data paths between two devices in the network. It is appreciated that the core domain is at a top of the hierarchical structure. In one embodiment, data traffic flow is updated within a domain where a topology change occurs while domains of the network other than the domain where the topology change occurs remain agnostic to the update to the data traffic flow.

The topology change is a change in link status, in one instance. According to one embodiment, a message is generated by a device within the domain where the topology changes in order to initiate the update. The message may be generated in response to the topology change. The message may include information associated with the device generating the message and further includes information associated with links coupled to the device generating the message. It is appreciated that devices within a same domain of the network continuously exchange messages, wherein a message transmitted by a transmitting device within the same domain includes information associated with the transmitting device and links coupled thereto. It is appreciated that each device, within the domain where the topology changes, may update data traffic flow in parallel and independent of other devices within the domain where the topology changes.

In one embodiment, a system includes a core domain in a network and a plurality of domains formed within the network. The core domain comprises a device and each domain of the plurality of domains comprises at least one device. The core domain and the plurality of domains are formed in a hierarchical structure to form at least two data paths between two devices in the network, wherein the core domain is at a top of the hierarchical structure. According to one embodiment, the data traffic flow is updated within a parent domain and a child domain in response to a change of status associated with a link coupling the parent domain to the child domain while domains of the network other than the parent domain and the child domain remain agnostic to the update to the data traffic flow. The parent domain is one hierarchical level closer to the core domain in comparison to the child domain within the network.

A message may be generated by a device within the parent domain to initiate the update. The message may include information associated with the parent domain and further includes information associated with data traffic flow on the link. A message may also be generated by a device within the child domain to initiate the update. The message may include information associated with the child domain and further includes information associated with data traffic flow on the link.

According to one embodiment, messages are generated and exchanged by a device in the parent domain and a device in the child domain that are connected via the link. The messages include information associated with the parent domain and the child domain, and wherein the messages include information associated with data traffic flow on the link. The link is determined to be a downlink connection in response to determining that the device in the parent domain is one hierarchical level closer to the core domain in comparison to the device in the child domain, wherein the determining is based on the messages.

BRIEF DESCRIPTION OF DRAWINGS

The present invention is illustrated by way of example, and not by way of limitation, in the figures of the accompanying drawings and in which like reference numerals refer to similar elements.

DETAILED DESCRIPTION

Figure 1:
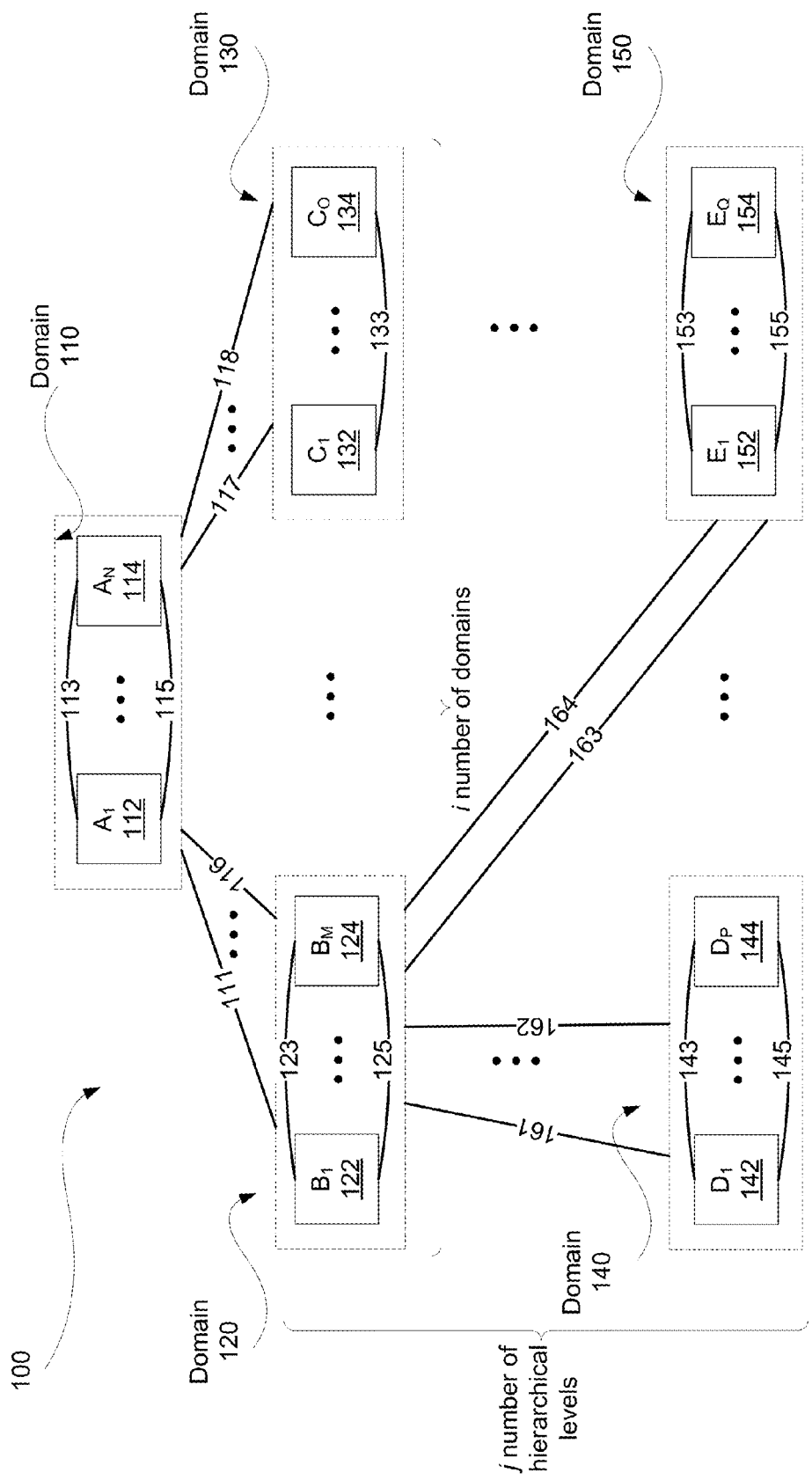
FIG. 1 shows a hierarchical network with active redundant links according to one embodiment.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts and data communication arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "creating," "generating," "storing," "determining," "sending," "receiving," "transmitting," "communicating," "providing," "accessing," "associating," "disabling," "enabling," "configuring," "initiating," "starting," "terminating," "ending," "configuring," "forming," "grouping," "updating" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Embodiments described herein are directed to hierarchical network structures that are configured to react quickly to topology changes within the network. In one exemplary embodiment, traffic distribution over the interconnection links is based on an algorithm that distributes groupings of flows over the interconnection links. Traffic distribution may set forwarding and/or blocking for each group of flows on each of the interconnection links.

It is appreciated that in exemplary embodiments described herein, the hierarchical network structures are not required to block all but one data path between two nodes unlike the spanning tree protocols. As a result, redundant and active link pathways are formed between devices that result in efficient use of the available bandwidth where all interconnection links can carry data.

According to one embodiment, devices (also referred to as nodes) are formed in a hierarchical network structure. For example, a group of devices may be grouped together to form a domain. A plurality of domains formed in a hierarchical structure forms a hierarchical network with a domain at the top of the network hierarchy that is referred to as a core domain. For example, a domain (referred to as a parent domain) may be connected to multiple domains that are further from the core domain (referred to as child domains). It is appreciated that the parent domain may also have a parent. The core domain has at least one child domain.

Devices within the same domain are connected to one another via links referred to as crosslinks. In contrast, a parent domain is connected to a child domain using one or more links referred to as downlink connections. Similarly, a child domain may be connected to a parent domain using one or more links referred to as uplink connections.

According to one embodiment, traffic flow topology is updated only within the same domain where the topology changes, e.g., link down, link up, addition of a new device to the domain, etc. In other words, traffic flow topology is updated only within the same domain where a change to a crosslink occurs. It is appreciated that "a link coming up" refers to when the link connecting two devices becomes active and that "a link goes down" refers to when the link becomes disabled or inactive. As a result, the updating of the traffic flow is contained within the domain where the change occurs, thereby reducing the disruption time to overall data flow of the network by eliminating the need to update other domains within the network. In other words, other devices and domains within the network other than the domain where the topology changes remain agnostic to the update and do not update their traffic flow.

In one embodiment, traffic flow topology is updated only in a parent domain and a child domain connected to one another via a link, where the link status changes, e.g., link failure, link up, link down, link added by introducing a new node within one of the domains, etc. As a result, the updating of the traffic flow is limited to the parent domain and the child domain, thereby reducing the disruption time to overall data flow of the network by eliminating the need to update other domains within the network. In other words, other devices and domains within the network other than the parent domain and the child domain connected to one another via a link where the link status changes, remain agnostic to the update and do not update their traffic flow. Therefore, responsiveness of the network to topology change is improved.

Referring now to FIG. 1, a hierarchical network 100 with active redundant links according to one embodiment is shown. In this exemplary embodiment, the network 100 includes domains 110, 120, 130, 140, and 150. Domain 110 is called the core domain because it is at the top of the hierarchical structure. The core domain 110 includes i number of children domains including domains 120 and 130. It is appreciated that domain 120 may have a number of children domains including domains 140 and 150. Moreover, it is appreciated that domain 130 may have a number of children domains (not shown). According to one embodiment, the hierarchical network 100 may include j+1 hierarchical levels that include the core domain 110.

It is appreciated that each domain of the hierarchical network 100 includes at least one device. For example, the core domain 110 may include devices $A_1$ 112 through $A_N$ 114. Similarly, domain 120 may include devices $B_1$ 122 through $B_M$ 124. Domain 130 may include devices $C_1$ 132 through $C_O$ 134. Domain 140 may include devices $D_1$ 142 through $D_P$ 144. Domain 150 may include devices $E_1$ 152 through $E_Q$ 154. It is appreciated that N, M, O, P, and Q are integers and symbolize the fact that each domain may include any number of devices.

Devices in the same domain are connected to one another using at least one or more crosslinks. For example, devices $A_1$ 112 and $A_N$ 114 are connected to one another using two crosslinks 113 and 115. However, it is appreciated that the devices within the same domain may be connected with any number of crosslinks and in any crosslink topology. Devices in domain 120 are connected to one another using crosslinks 123 and 125. Devices in domain 130 are connected to one another using crosslink 133. Devices in domain 140 are connected to one another using crosslinks 143 and 145 and devices in domain 150 are connected to one another via crosslinks 153 and 155. It is appreciated that showing of any number of crosslinks between devices is exemplary and not intended to limit the scope of the present invention. Furthermore, it is appreciated that crosslink connections that connect the same devices within the same domain may be aggregated to form a single crosslink (not shown).

According to one embodiment, domains having a parent/child relationship are connected to one another using at least one uplink connection or at least one downlink connection. For example, the core domain 110 is connected to its child domain 120 via uplink/downlink connections 111 through 116 while it is connected to its child domain 130 via uplink/downlink connections 117 through 118. It is appreciated that the number of uplink/downlink connections are merely exemplary and not intended to limit the scope of the present invention. Moreover, any link connecting a parent domain to a child domain may be both an uplink and a downlink connection. It is appreciated that more than one uplink/downlink connections connecting a device within a parent domain to the same device within a child domain may be aggregated into a single uplink/downlink connection (not shown).

In this exemplary embodiment, domain 120 is connected to its children domains, e.g., domains 140 and 150, via uplink/downlink connections 161, 162, 163, and 164. Domain 130 is connected to its children domain(s) (not shown) via its uplink/downlink connections.

It is appreciated that domains 140 and 150 may also be parents to other domains (not shown). As such, the hierarchical structure shown is exemplary and not intended to limit the scope of the preset invention. It is noteworthy that since the network is structured in a hierarchical format, any topological change, e.g., within a domain, can be addressed by that domain only, thereby eliminating the need to update the traffic flow within other domains and as a result reducing the disruption time to overall data flow of the network. Moreover, since the network is structured in a hierarchical format, any topological change between a parent and the child domain can be addressed by the parent and the child domain, thereby eliminating the need to update the traffic flow within other domains and as a result reducing the disruption time to overall data flow of the network. In other words, domains of the hierarchical network that are not associated with the topological change remain agnostic to the traffic flow update. Moreover, the hierarchical structure, as shown, includes many different pathways connecting any two devices, thereby introducing redundancy that can be used to carry traffic and improve bandwidth efficiency.

Figure 2A:
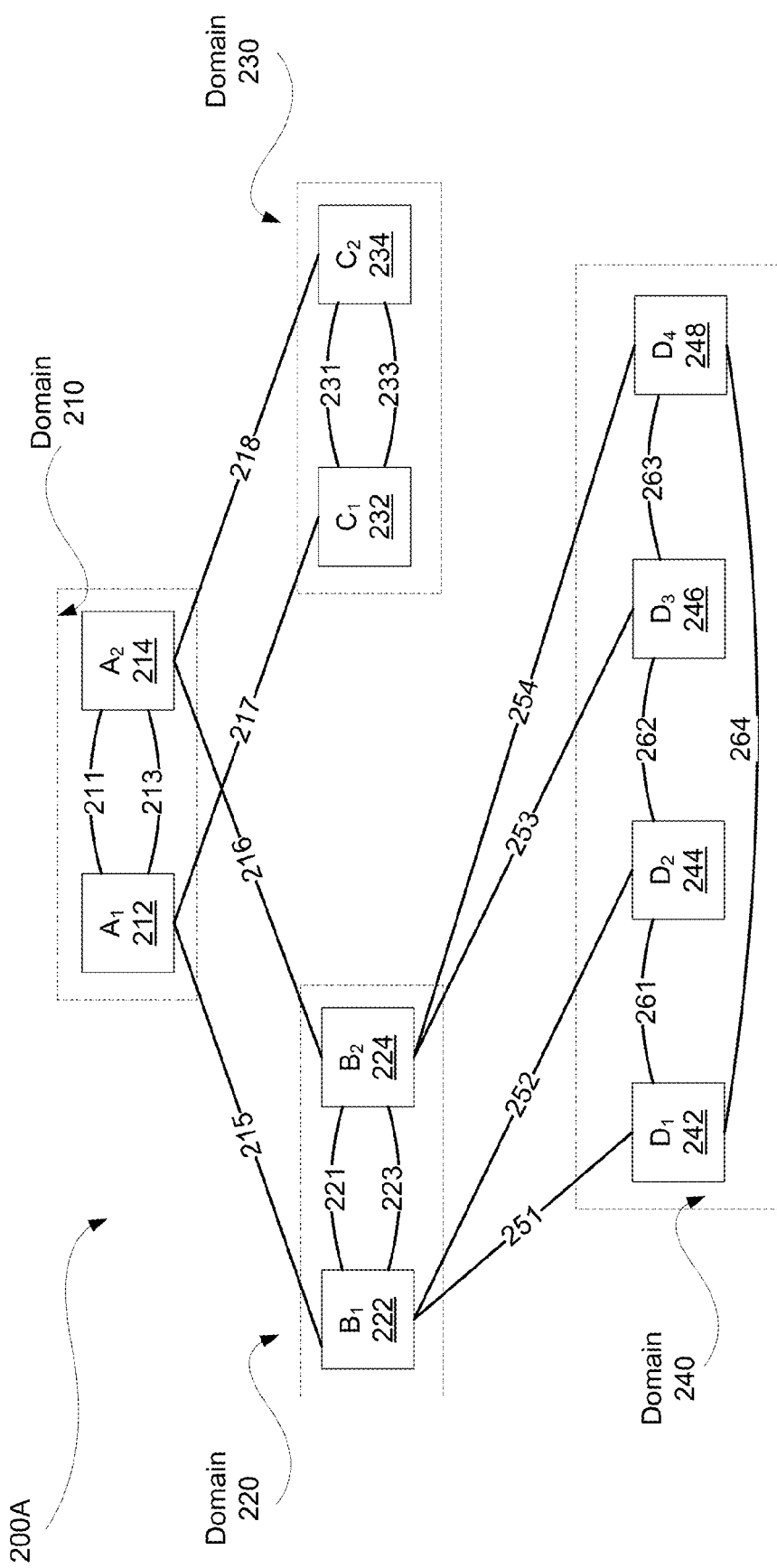
FIGS. 2A-2D show an exemplary hierarchical network with active redundant links and subsequent topology changes in accordance with one embodiment.

FIGS. 2A-2D show an exemplary hierarchical network with active redundant links and subsequent topology changes in accordance with one embodiment. Referring now to FIG. 2A, a hierarchical network 200A with active redundant links in accordance with one exemplary embodiment is shown. Network 200A includes domains 210, 220, 230, and 240. Domain 210 is the core domain and it has two child domains 220 and 230. Domain 220 is a parent domain to the child domain 240.

The core domain 210 includes two devices (nodes) $A_1$ 212 and $A_2$ 214 connected to one another using crosslinks 211 and 213. Domain 220 includes two devices (nodes) $B_1$ 222 and $B_2$ 224 connected to one another using crosslinks 221 and 223 while domain 230 includes two devices (nodes) $C_1$ 232 and $C_2$ 234 connected to one another using crosslinks 231 and 233. Domain 240 includes four devices (nodes) $D_1$ 242, $D_2$ 244, $D_3$ 246, and $D_4$ 248 connected to one another using crosslinks 261, 262, 263, and 264.

In this exemplary embodiment, device $A_1$ 212 is connected to device $B_1$ 222 of the child domain 220 using downlink/uplink connection 215. Device $A_1$ 212 is also connected to device $C_1$ 232 of the child domain 230 using downlink/uplink connection 217. Device $A_2$ 214 is connected to device $B_2$ 224 of the child domain 220 using downlink/uplink connection 216 while connecting to device $C_2$ 234 of domain 230 using downlink/uplink connection 218. In this exemplary embodiment, device $B_1$ 222 is connected to device $D_1$ 242 of the child domain 240 using downlink/uplink connection 251 while connecting to device $D_2$ 244 of domain 240 using downlink/uplink connection 252. Device $B_2$ 224 is connected to device $D_3$ 246 of the child domain 240 using downlink/uplink connection 253 while connecting to device $D_4$ 248 of domain 240 using downlink/uplink connection 254.

It is appreciated that the number of devices (nodes) within each domain may vary and the number of devices shown is merely for illustration purposes and not intended to limit the scope of the present invention. Furthermore, the particular topology of crosslinks and uplink/downlink shown is merely for illustration purposes and not intended to limit the scope of the present invention.

Figure 2B:
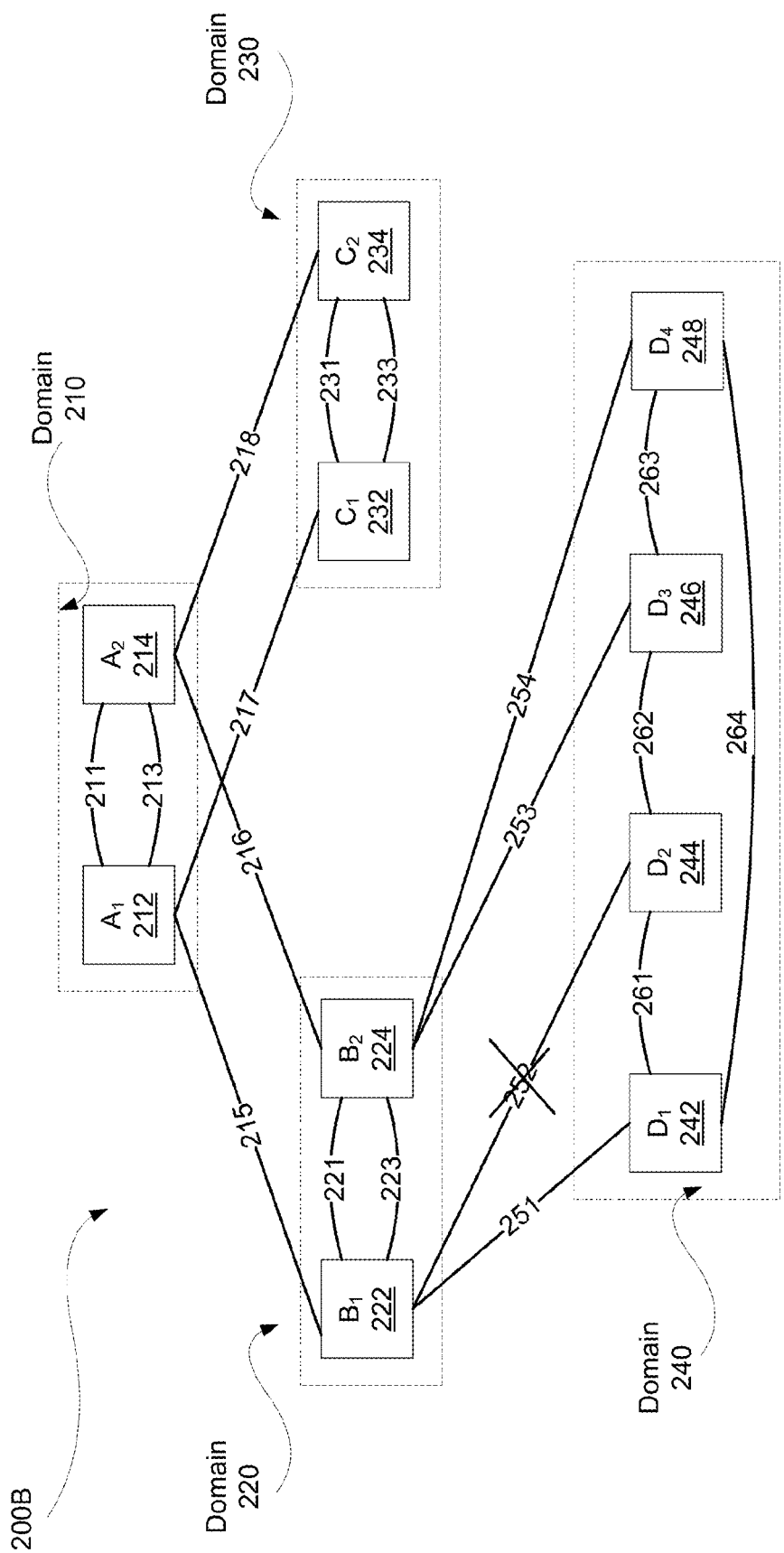

Referring now to FIG. 2B, a change in topology of network 200A is shown in accordance with one embodiment. For example, the topology of new network 200B may be similar to that of network 200A except that a status of a link, e.g., link 252, connecting a parent/child domain, e.g., domains 220 and 240, is changed, e.g., link 252 may come up from being down. The change of status or topology change may include a link coming up, a link going down, a new device and therefore a new link being added, a link failing, etc.

Figure 2C:
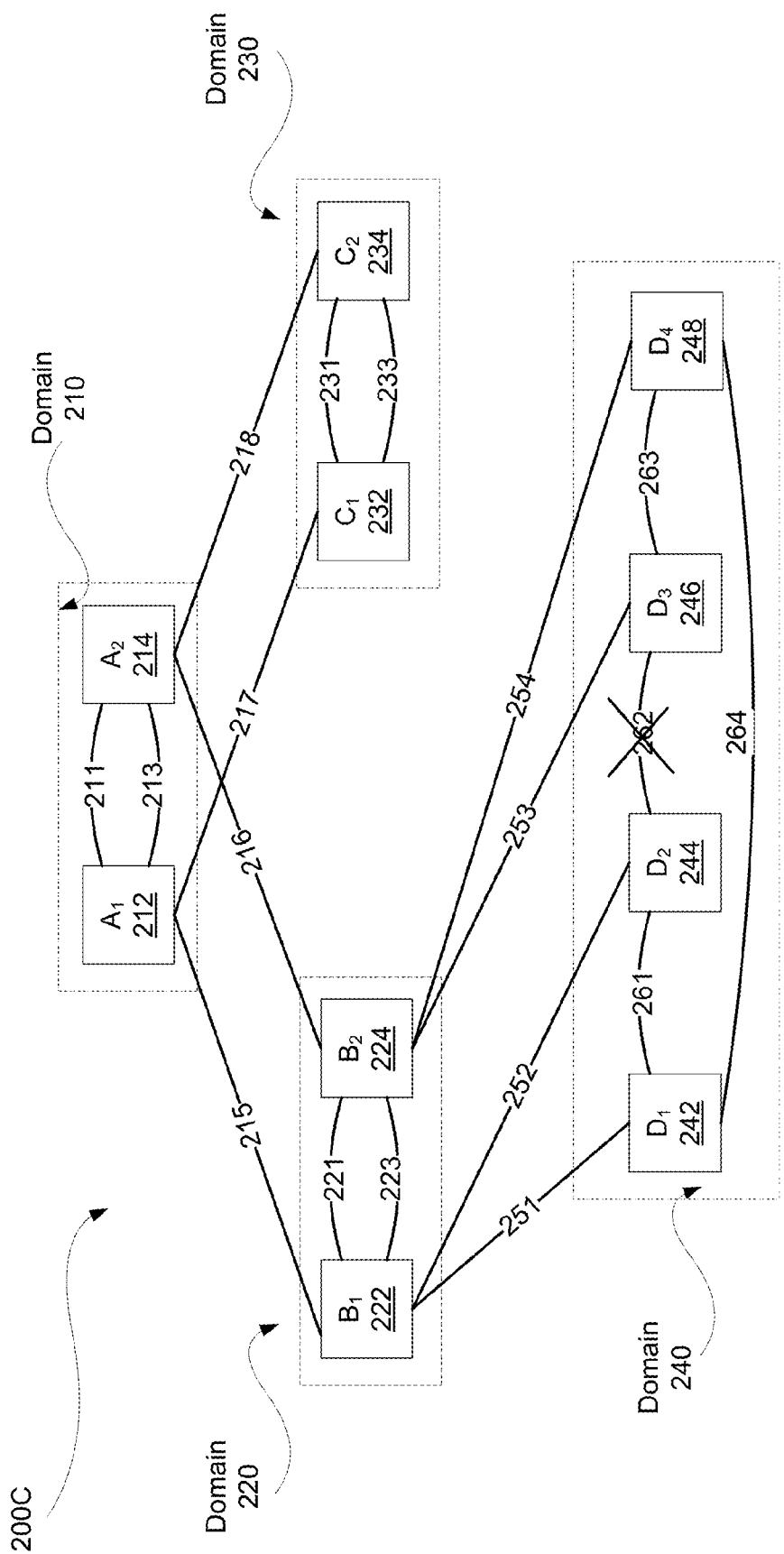

Referring now to FIG. 2C, a change in topology of network 200A is shown in accordance with one embodiment. For example, the topology of new network 200C may be similar to that of network 200A except that a status of a crosslink, e.g., crosslink 262, with a domain, e.g., domain 240, may change. The change of status or the topology change may include a link coming up, a link going down, a new device and therefore a new link being added, a link failing, etc.

Figure 2D:
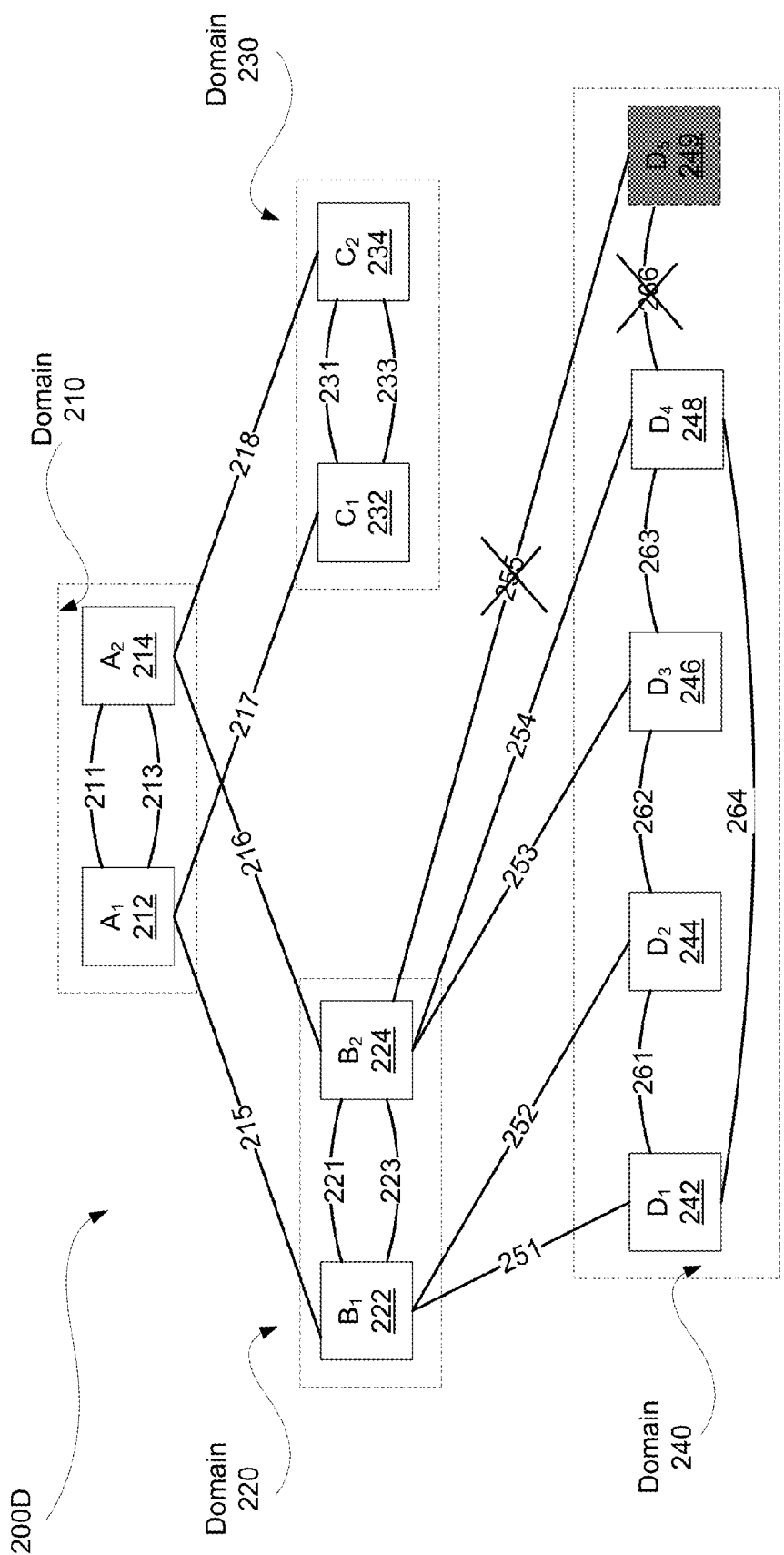

Referring now to FIG. 2D, a change in topology of network 200A is shown in accordance with one embodiment. For example, the topology of new network 200D may be similar to that of network 200A except that the topology of domain 240 is changed by adding a new device $D_5$ 249 to the domain. As a result of adding a new device, one or more links may also be established, e.g., crosslink 266 and/or downlink/uplink connection 255.

Topology changes within the hierarchical network can be contained within a smaller number of devices and domains, thereby eliminating the need for the entire traffic flow of the network to be updated. For example, if a topology change is to a crosslink then only the traffic flow within the domain associated with the crosslink that was altered is updated and the traffic flow of the rest of the domains and devices of the network are kept unchanged and remain agnostic to the crosslink topology change. Similarly, if a topology change is between parent/child domains, e.g., change to a downlink/uplink connection, only the traffic flow of the parent/child domain directly connected to the downlink/uplink connection where the status changes are updated. As such, the traffic flow of the rest of the domains and devices within the network remains unchanged and agnostic to the topology change and update. Accordingly, not only is the traffic flow updated much faster than in a conventional system but the network is also able to carry data through most of its links (redundant links), thereby making efficient use of its available bandwidth.

In one embodiment, various devices of the network are in communication with one another. For example, devices within the same domain may periodically send crosslink messages to one another. In this exemplary embodiment, device $A_1$ 212 may transmit crosslink messages to device $A_2$ 214 and vice versa. Similarly, devices within other domains may transmit crosslink messages to one another, e.g., device $D_1$ 242 and $D_2$ 244 communicating crosslink messages, devices $D_2$ 244 and $D_3$ 246 communicating crosslink messages, devices $D_3$ 246 and $D_4$ 248 communicating crosslink messages, devices $D_1$ 242 and $D_4$ 248 communicating crosslink messages, etc. A crosslink message may contain information about the transmitting device (node). Crosslink messages may further include information regarding every crosslink in that domain, e.g., the information may include whether a link is up or down. It is appreciated that crosslink messages may also include information such as the number of uplink connections, the domain identifier of the sending device, the interface index of the link the message is sent from, the media access control (MAC) address of the transmitting device, any flags to be passed on, distance of the sending device to the core domain, etc.

In contrast, a device in a parent domain may transmit a downlink message to a device in its child domain. A device in a child domain may transmit an uplink message to a device in its parent domain. For example, device $B_1$ 222 may periodically communicate downlink messages to devices $D_1$ 242 and $D_2$ 244 while devices $D_1$ 242 and $D_2$ 244 may periodically communicate uplink messages to device $B_1$ 222. A downlink message may contain information about the domain transmitting the downlink message, traffic flow, such as blocking, or forwarding of the VLANs configured on the downlink connection, distance of the domain to the core domain, etc. An uplink message may contain information about the domain transmitting the uplink message, MAC address of the sending device, the distance to the core domain, information regarding every uplink in the domain, any flags to be passed on, etc.

According to one embodiment, uplink information may be shared among devices within the same domain using crosslink-uplink messages. Crosslink-uplink messages may be communicated between devices of the same domain periodically. Crosslink-uplink messages may contain information regarding uplink connections connected to the domain and further include information regarding the parent domain. For example, device $D_1$ 242 and $D_4$ 248 may communicate crosslink-uplink messages to provide information regarding uplink connections 251, 252, 253, and 254 as well as the parent domain 220. It is further appreciated that crosslink-uplink messages may also include the information contained in the uplink messages between the two domains.

In one embodiment, downlink information may be shared among devices within the same domain using crosslink-downlink messages. Crosslink-downlink messages may be communicated between devices of the same domain periodically. Crosslink-downlink messages may contain information regarding each of the downlink connections connected to the domain and further include information regarding the children domain connected thereto. For example, device $B_1$ 222 and $B_2$ 224 may communicate crosslink-downlink messages to provide information regarding downlink connections 251, 252, 253, and 254 as well as the child domain 240. It is further appreciated that crosslink-downlink messages may also include the information contained in the downlink messages between the two domains.

It is appreciated that these messages may be periodically transmitted and/or be triggered in response to a change in topology. Since these messages are being communicated between devices within the same domain or between a parent/child domain, traffic flow of a domain affected by a topology change is updated without having to update the traffic flow of the entire network. For example, traffic flow of a domain where a crosslink status changes can be updated using crosslink messages. Similarly, traffic flow of a parent and child domain, where an uplink/downlink connection status connecting the two changes, is updated using uplink/downlink messages. As such, traffic flow may be updated within the domain where the topology changes or within a parent/child domain connected to a link where its status changes while other domains and devices within the network remain agnostic to the traffic flow update. These messages may be used in order to update traffic flow of the network in response to a change in topology.

Referring back to FIG. 2B, a change in the downlink/uplink connection 252 occurs. For example, the link 252 may become active, also referred to as link up. In response to messages being communicated (either through periodic communication or being triggered as a result of a topology change) between the parent domain 220 and the child domain 230, the traffic flow of these two domains may be updated without a need to update the traffic flow of domains 210 and 230. In this exemplary embodiment, uplink messages and/or downlink messages may be communicated between devices $B_1$ 222 and $D_2$ 244 via link 252. From these messages, the traffic flow of domain 220 and 240 may be updated. It is appreciated that each device may extract and store information from the communicated messages. For example, information such as crosslink port information, downlink port information, uplink port information, children domain information, and optionally parent domain information may be stored. The information may further be shared with other devices, e.g., devices $B_1$ 222 and $B_2$ 224, of the parent domain 220 using crosslink-downlink messages and may be further shared with other devices, e.g., $D_1$ 242, $D_2$ 244, $D_3$ 246, and $D_4$ 248, of the child domain 240 using crosslink-uplink messages. As such, all of the devices within the parent domain 220 and the child domain 240 can update the traffic flow without a need to update the traffic flow in other domains, e.g., domains 210 and 230.

Referring back to FIG. 2C, a change in the crosslink connection 262 is shown. For example, the crosslink connection 262 may come up. In response to messages being communicated (either periodically or triggered as a result of a topology change) between devices of domain 240, the traffic flow may be updated within domain 240. As such, traffic flow of domains 210, 220, and 230 remains unaffected and those domains remain agnostic to the update in domain 240.

In this exemplary embodiment, crosslink messages may be communicated between device $D_2$ 244 and $D_3$ 246 via the crosslink connection 262. Information regarding the crosslink connection 262, e.g., crosslink port information, may be extracted and stored by each device, e.g., devices $D_2$ 244 and $D_3$ 246. The updated information impacts the traffic flow. The updated information may also be shared with other devices within the domain 240. For example, information may be shared using crosslink messages with devices $D_1$ 242 and $D_4$ 248 via their crosslink connections 263 and 261 respectively.

Figure 3A:
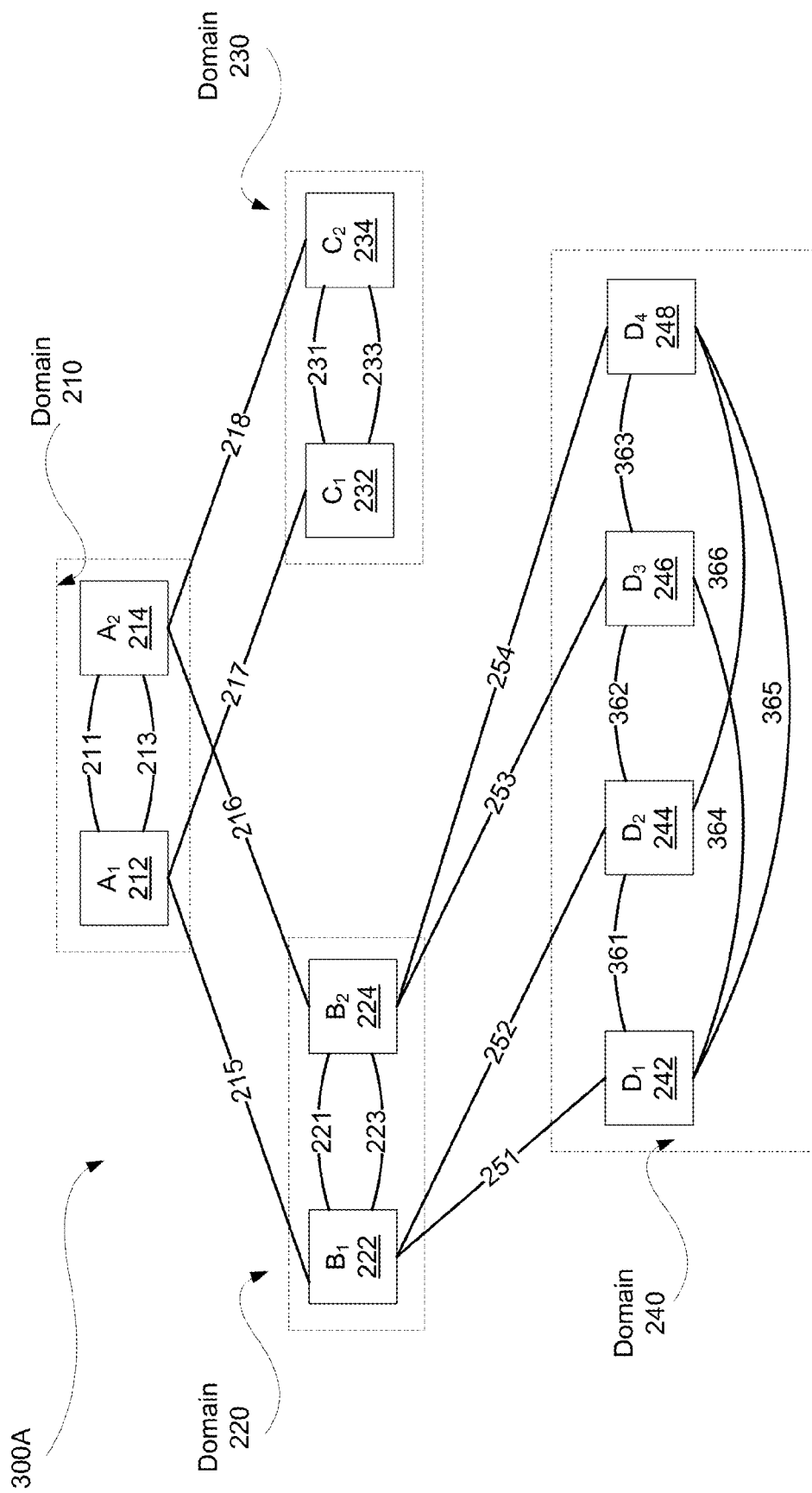
FIGS. 3A and 3B show an exemplary hierarchical network with active redundant links with different crosslink topologies in accordance with one embodiment.
Figure 3B:
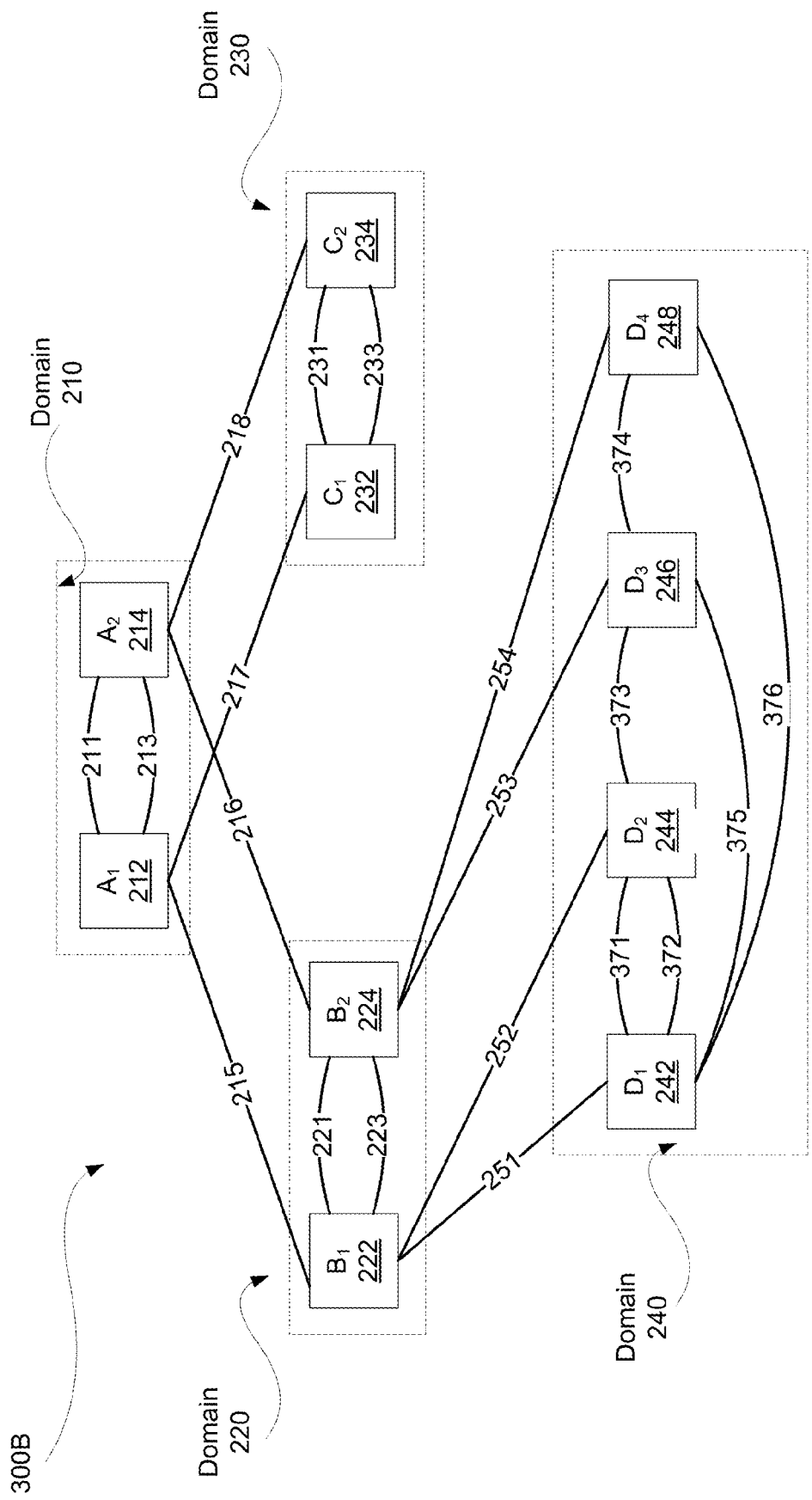

Referring now to FIGS. 3A and 3B, an exemplary hierarchical network with active redundant links with different crosslink topologies in accordance with one embodiment are shown. FIG. 3A shows network 300A that is substantially similar to network 200A above except for the crosslink connections of domain 240. For example, device D$_1$ 242 is connected to device D$_2$ 244 via crosslink connection 361. Device D$_2$ 244 is connected to device D$_3$ 246 via crosslink connection 362. Device D$_3$ 246 is connected to device D$_4$ 248 via crosslink connection 363. Device D$_1$ 242 is connected to device D$_3$ 246 via crosslink connection 364. Device D$_1$ 242 is connected to device D$_4$ 248 via crosslink connection 365. Furthermore, device D$_2$ 244 is connected to device D$_4$ 248 via crosslink connection 366. The nodes in domain 240 form a full mesh.

In contrast, referring now to FIG. 3B, network 300B is shown with a different crosslink connection topology in accordance with one embodiment. For example, device D$_1$ 242 is connected to device D$_2$ 244 via crosslink connections 371 and 372. Device D$_2$ 244 is connected to device D$_3$ 246 via crosslink connection 373. Device D$_3$ 246 is connected to device D$_4$ 248 via crosslink connections 374. Device D$_1$ 242 is connected to device D$_3$ 246 via crosslink connections 375. Furthermore, device D$_1$ 242 is connected to device D$_4$ 248 via crosslink connection 376. The nodes in domain 240 form a partial mesh. It is appreciated that crosslink connections 371 and 372 may be aggregated (not shown) since they connect to the same two devices.

Figure 4A:
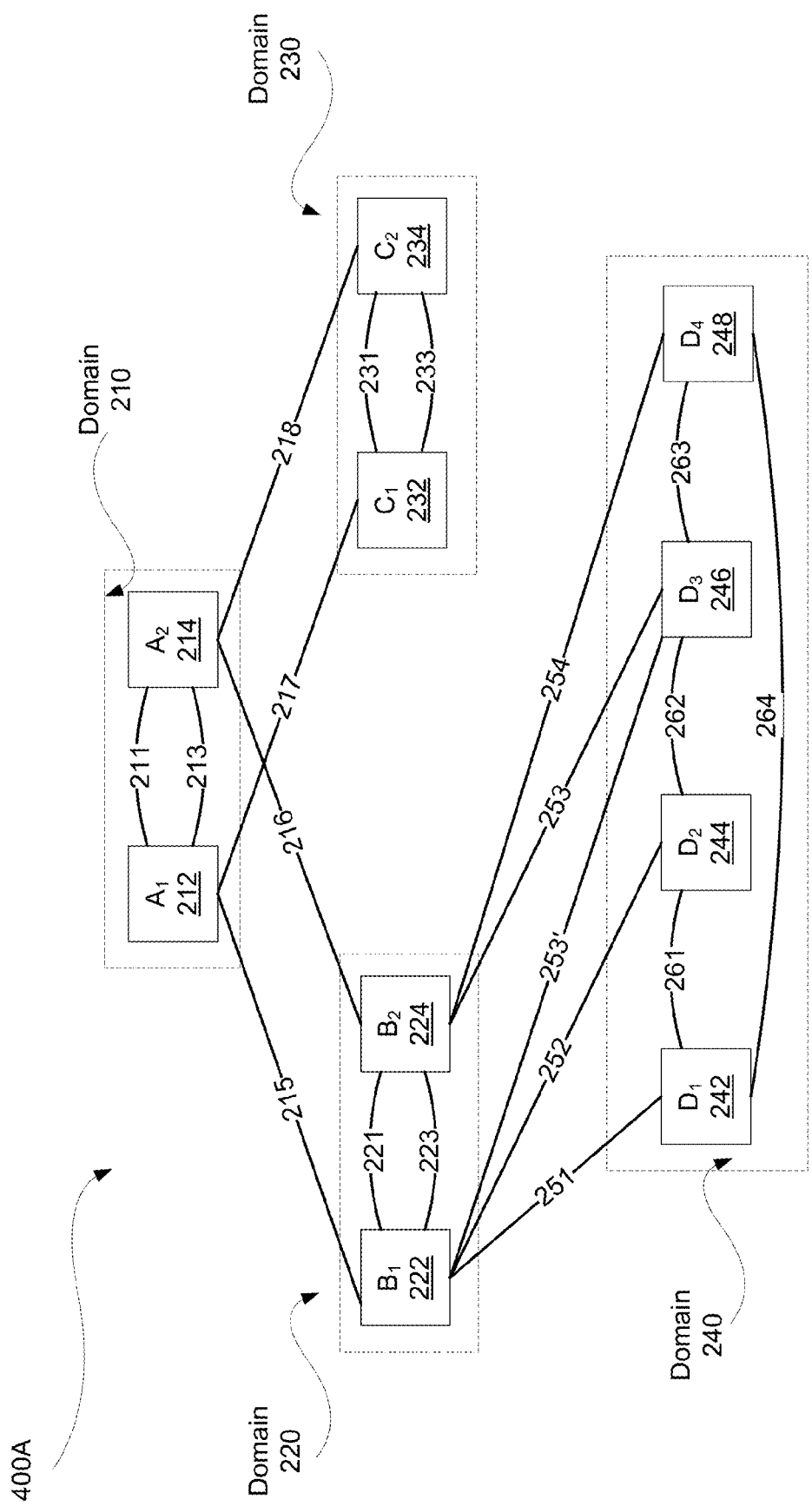
FIGS. 4A-4C show an exemplary hierarchical network with active redundant links with allowed and disallowed link connections in accordance with one embodiment.
Figure 4B:
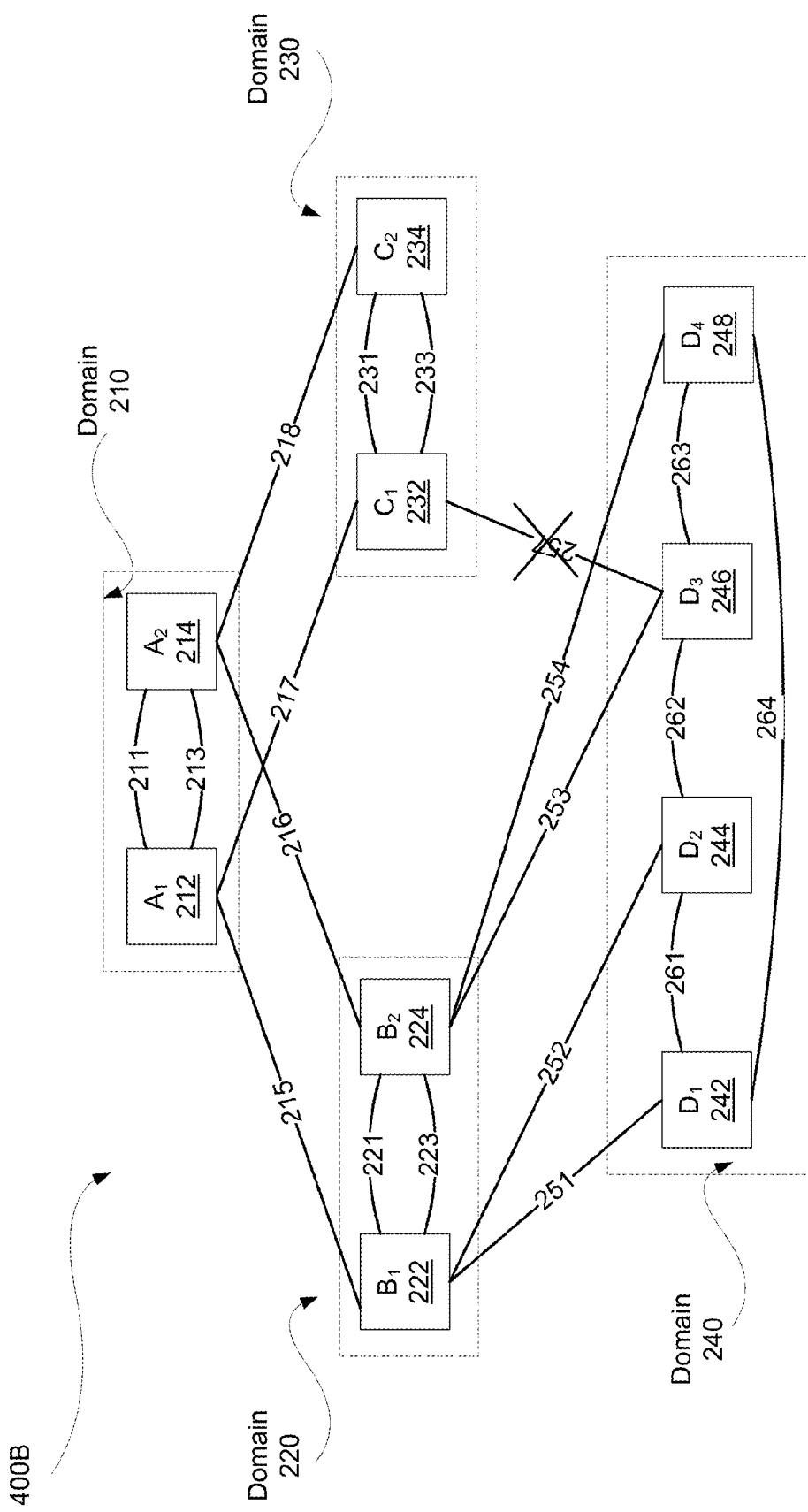
Figure 4C:
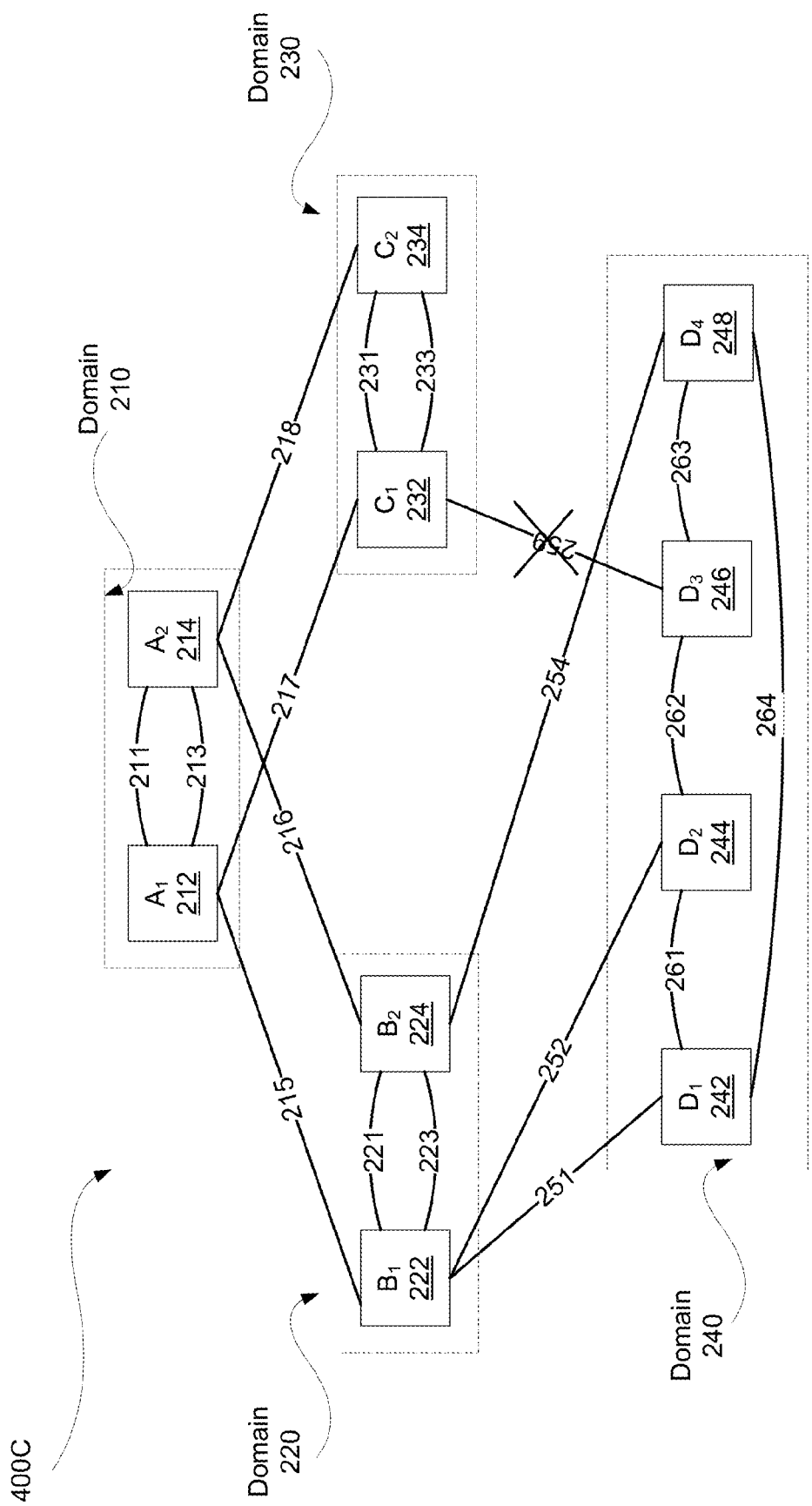

FIGS. 4A-4C show an exemplary hierarchical network with active redundant links with allowed and disallowed link connections in accordance with one embodiment. Referring to FIG. 4A, network hierarchical structure 400A is shown that is substantially similar to 200A except for an additional downlink/uplink connection 253' between the parent domain 220 and the child domain 240. In this exemplary embodiment, device D$_3$ 246 is connected to two parent devices B$_1$ 222 and B$_2$ 224 that are within the same domain 220. It is appreciated that any device may have multiple device parents as long as those devices are within the same domain.

Referring now to FIG. 4B, an exemplary uplink/downlink connection that is disallowed is shown. In this embodiment, device D$_3$ 246 is connected to two parent devices B$_2$ 224 and C$_1$ 232 via uplink/downlink connections 253 and 257 respectively that are in different domains 220 and 230 respectively. However, a device may not have multiple device parents that are in different domains. In this exemplary network, since other devices within domain 240 are children of domain 220, the uplink/downlink connection 257 is disabled in order to make device D$_3$ 246 a child of the same domain 220 as well.

Referring now to FIG. 4C, an exemplary uplink/downlink connection that is disallowed is shown. In this embodiment, device D$_3$ 246 is connected to a parent device C$_1$ 232 via uplink/downlink connection 259. However, a device within the same domain cannot be a child of two different domains. For example, device D$_1$ 242 of domain 240 cannot be a child of domain 220 while device D$_3$ 246 of domain 240 is a child of domain 230. Since most of the devices in domain 240 are children of domain 220, the uplink/downlink connection 259 is disabled in order to sever the parent child relationship between devices C$_1$ 232 and D$_3$ 246. Alternatively, the uplink/downlink connection 259 could have been retained and the uplink/downlink connections 251, 252, and 254 could have been disabled.

Figure 5:
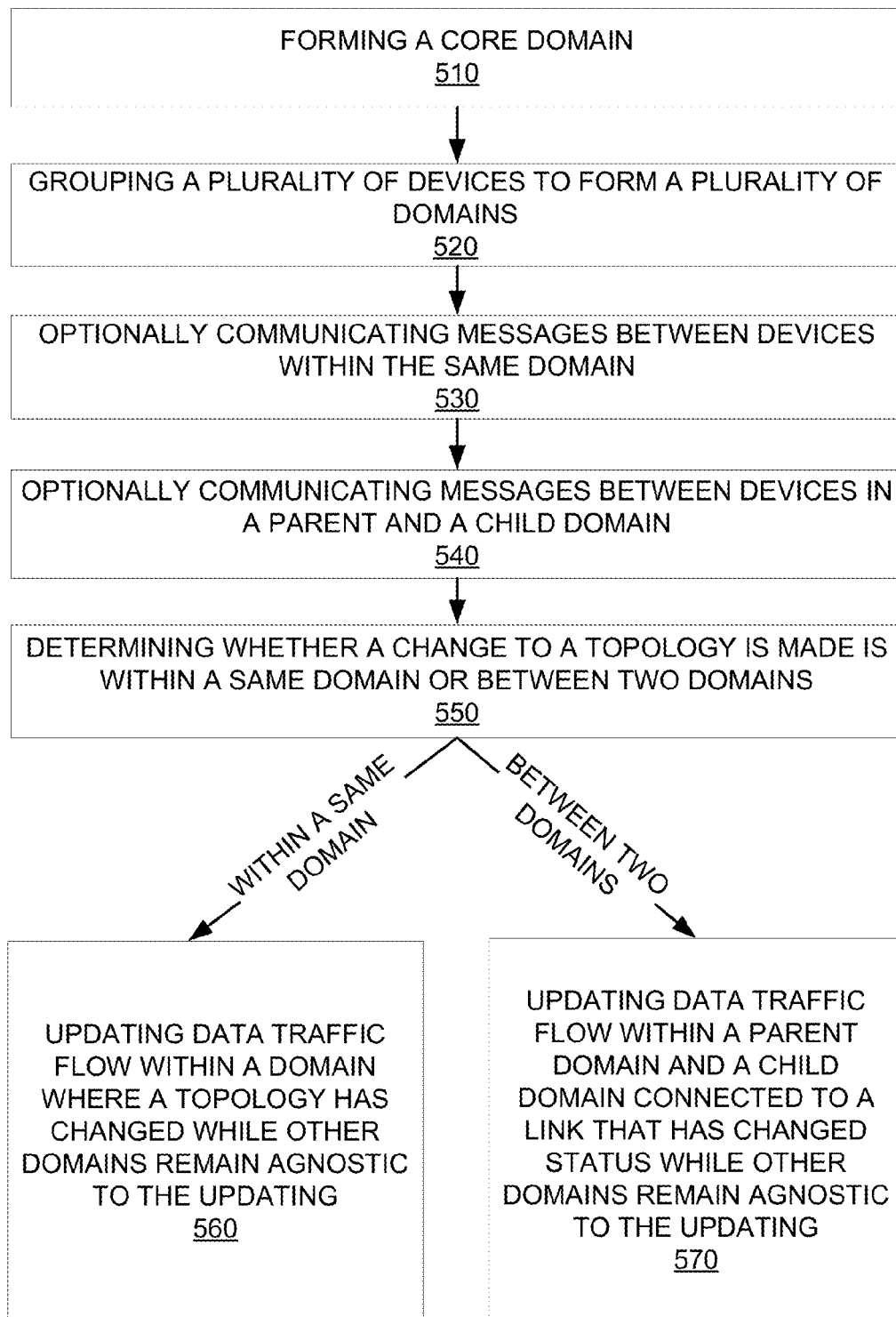
FIG. 5 shows an exemplary block diagram of forming a hierarchical network with active redundant links and for updating traffic flow in response to topology changes in accordance with one embodiment.

The devices and links discussed with respect to FIGS. 5-8 refer to the devices and links in the topology of FIG. 2A. FIG. 5 shows an exemplary block diagram 500 of forming a hierarchical network with active redundant links and for updating traffic flow in response to topology changes in accordance with one embodiment. At step 510, a core domain is formed. A core domain may include at least one device (node). It is appreciated that the core domain is at the top of the hierarchical structure. For example, devices A$_1$ 212 and A$_2$ 214 may be grouped to form the core domain 210.

At step 520, a plurality of devices is grouped to form a plurality of domains. For example, devices B$_1$ 222 and B$_2$ 224 may be grouped to form domain 220 and devices D$_1$ 242, D$_2$ 244, D$_3$ 246, and D$_4$ 248 may be grouped to form domain 240. It is appreciated that the core domain and the plurality of domains are arranged to form a hierarchical structure. At step 530, messages may optionally be communicated between different devices within the same domain. For example, the messages may be crosslink messages, crosslink-uplink messages, and crosslink-downlink messages. It is appreciated that the message of step 530 may be communicated periodically or in response to a change in topology of the domain.

At step 540, messages between a device in a child domain and a device in its parent domain may be optionally communicated. For example, a device in a parent domain may communicate downlink messages to a device in its child domain. Similarly, a device in a child domain may communicate uplink messages to a device in its parent domain. It is appreciated that messages of step 540 may be communicated periodically or in response to a link status connecting the parent domain to the child domain.

At step 550, it is determined whether a change in topology is made within a domain or between parent/child domains. It is appreciated that the determination may be made using the communicated messages, e.g., downlink messages, uplink messages, crosslink messages, crosslink-uplink messages, and crosslink-downlink messages. At step 560, traffic flow is updated within a domain where a topology is changed while other domains and devices in the network remain agnostic and unaware of the updated topology. For example, traffic flow associated with domain 240 and devices within it may be updated if the status of the crosslink connection 262 changes.

At step 570, traffic flow is updated in a parent/child domain where the topology change occurs within the link status connecting the parent/child domain while other domains and devices in the network remain agnostic and unaware of the updated topology in the parent/child domains. For example, traffic flow associated with domains 220 and 240 and devices within them may be updated if the status of the uplink/downlink connection 252 changes.

Figure 6:
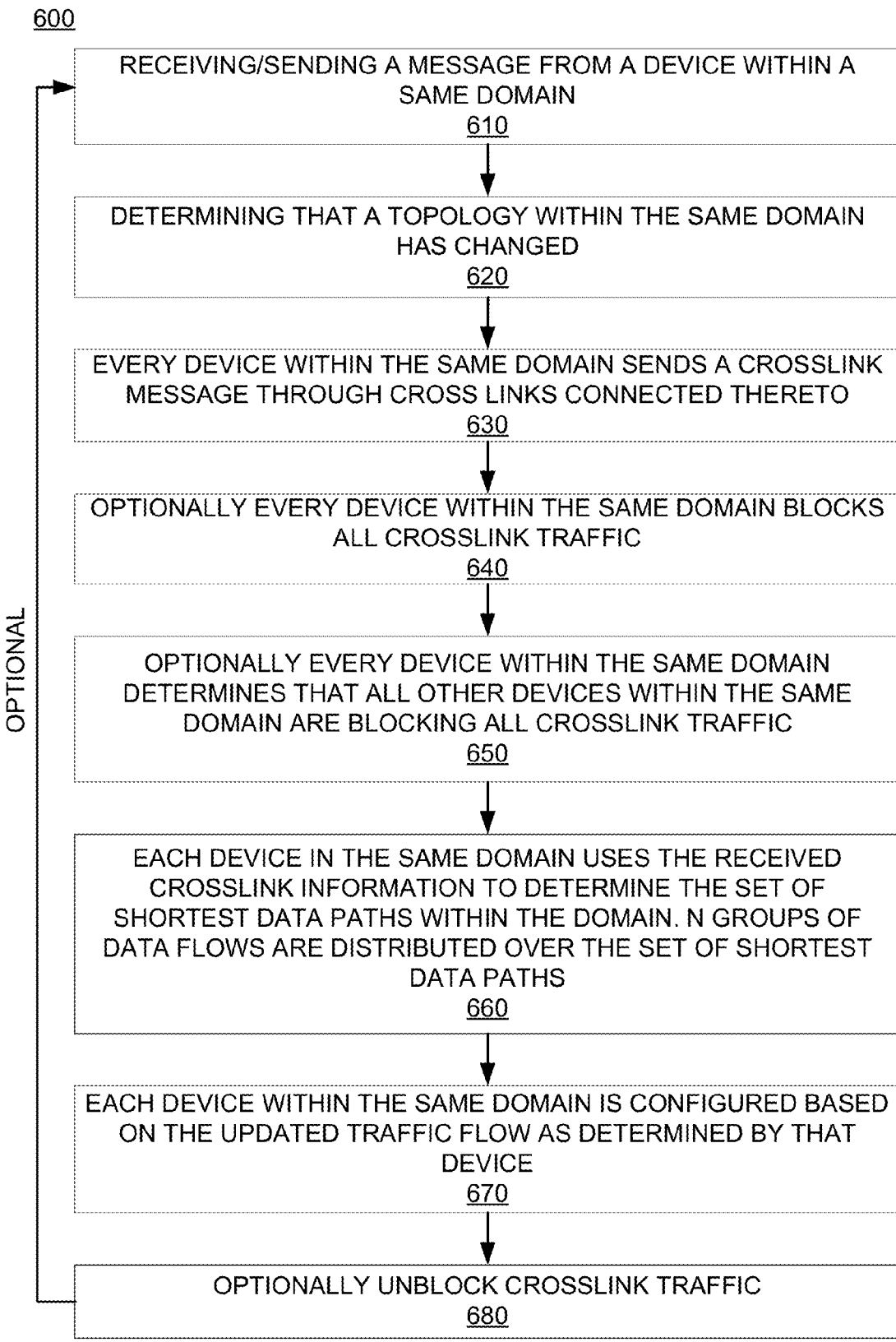
FIG. 6 shows an exemplary block diagram for updating traffic flow within the same domain where the topology changes in accordance with one embodiment.

FIG. 6 shows an exemplary block diagram 600 for updating traffic flow within the same domain where the topology changes in accordance with one embodiment. At step 610, messages are communicated between devices within the same domain. For example, crosslink messages may be communicated between devices D$_1$ 242, D$_2$ 244, D$_3$ 246, and D$_4$ 248 of domain 240. It is appreciated that the crosslink messages may be transmitted periodically between devices of the same domain or they may be transmitted in response to a change in topology in the domain.

At step 620, it is determined whether a topology within the domain has changed. For example, crosslink port information may be updated to indicate that a link up event has occurred and that it has a port associated with the link up event.

At step 630, every device within the same domain 240 sends/receives crosslink messages through their associated crosslink connected thereto. For example, devices D$_1$ 242 and D$_2$ 244 communicate crosslink messages via crosslink connection 261 whereas devices D$_1$ 242 and D$_4$ 248 communicate crosslink messages via crosslink connection 264. Similarly other devices within domain 240 communicate the crosslink messages to one another. At optional step 640, every device, e.g., devices D$_1$ 242, D$_2$ 244, D$_3$ 246, and D$_4$ 248, within the same domain, e.g., domain 240, may block all crosslink traffics. Furthermore, at optional step 650, every device, e.g., devices $D_1$ 242, $D_2$ 244, $D_3$ 246, and $D_4$ 248, within the same domain, e.g., domain 240, may determine that all devices within the domain, e.g., domain 240, are blocking all crosslink traffics.

At step 660, each device, e.g., devices $D_1$ 242, $D_2$ 244, $D_3$ 246, and $D_4$ 248, within the same domain, e.g., domain 240, may independently determine and update traffic flow based on the received messages. The determined traffic flow is derived from the received crosslink information. The received crosslink information may be used to calculate and determine a set of data paths having a shortest data path within the domain. A number of data flow groups are distributed over the set of calculated and determined data paths. It is appreciated that the determination of step 660 may be done in parallel or sequentially. At step 670, every device within the same domain may be configured with the determined and updated traffic flow independently. At optional step 680, all devices within the same domain may unblock the crosslink traffic that was blocked previously at step 640.

Figure 7:
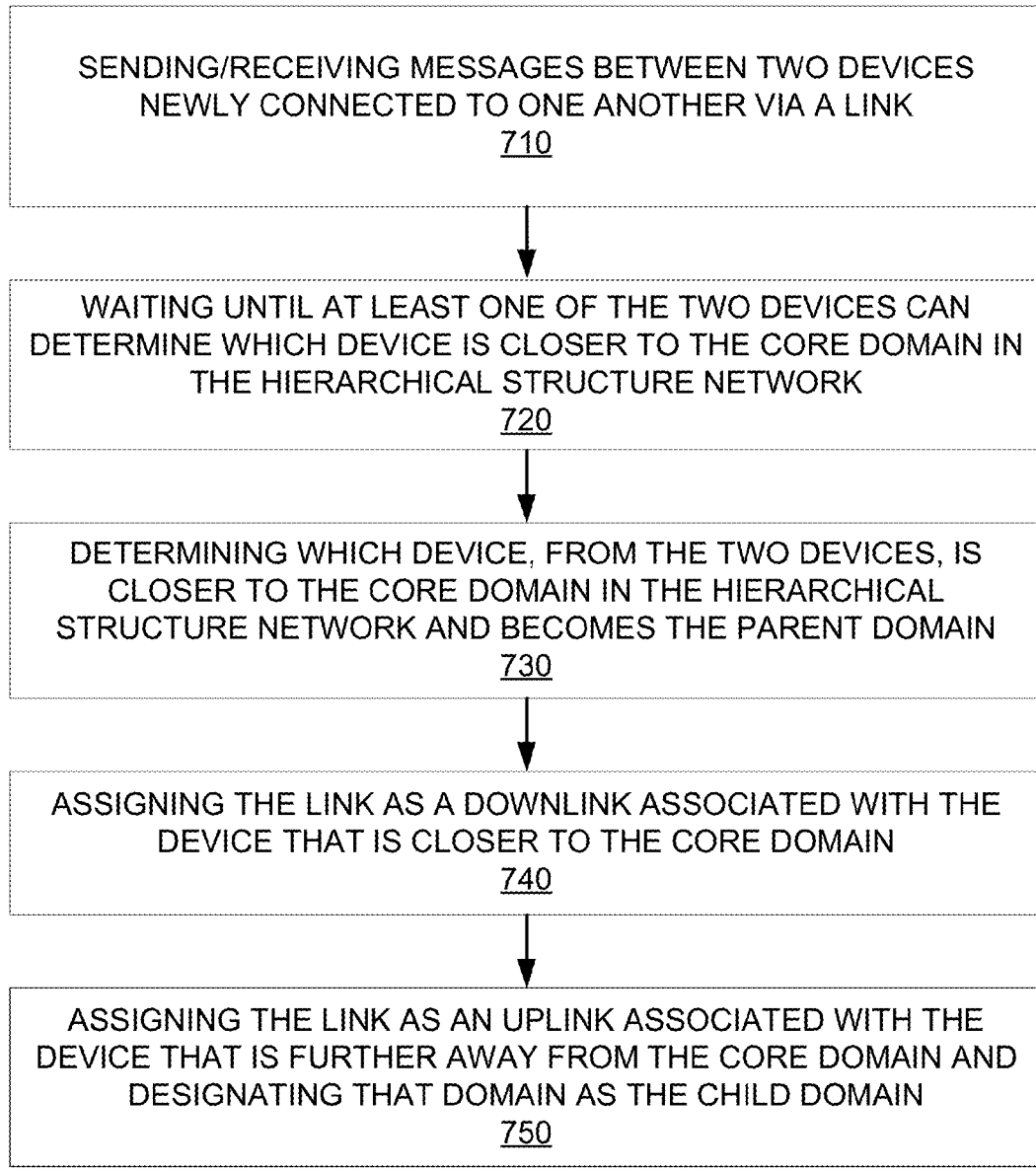
FIG. 7 shows an exemplary block diagram for determining the parent child relationship between two domains in a hierarchical network in accordance with one embodiment.

FIG. 7 shows an exemplary block diagram 700 for determining the parent child relationship between two interconnected domains in accordance with one embodiment. At step 710, a link between two domains changes status to up and the two domains become connected. Downlink messages may be communicated between devices $B_1$ 222 and $D_1$ 242. It is appreciated that the downlink messages may be communicated periodically between devices or triggered and communicated after a topology change between parent/child domains occurs. Furthermore, it is appreciated that the uplink/downlink messages may be communicated via an uplink/downlink connection that was just changed, e.g., uplink/downlink connection 251 in FIG. 2A, according to one embodiment. It is appreciated that step 710 may be optional.

At step 720, the devices wait until one of the two devices can determine which one of the two devices is closer to the core domain in the hierarchical structure network. For example, devices $B_1$ 222 and $D_2$ 244 wait until one of them can determine which one is closer to the core domain 210. At step 730, it is determined which device is closer to the core domain, e.g., device $B_1$ 222 is determined to be closer to the core domain 210. At step 740, the link is assigned as a downlink connection associated with the device that is closer to the core domain, e.g., link 251 is assigned as a downlink connection associated with device $B_1$ 222. In contrast, at step 750, the link is assigned as an uplink connection associated with the device that is further from the core domain. It is appreciated that information within the uplink messages and/or downlink messages may be shared with other devices in the same domain using crosslink-uplink messages and crosslink-downlink messages. Accordingly, traffic flow associated with a parent domain and a child domain may be updated and stored within each device of the parent domain and the child domain associated with the topology change while other domains and devices of the network remain agnostic to the updated traffic flow.

Figure 8:
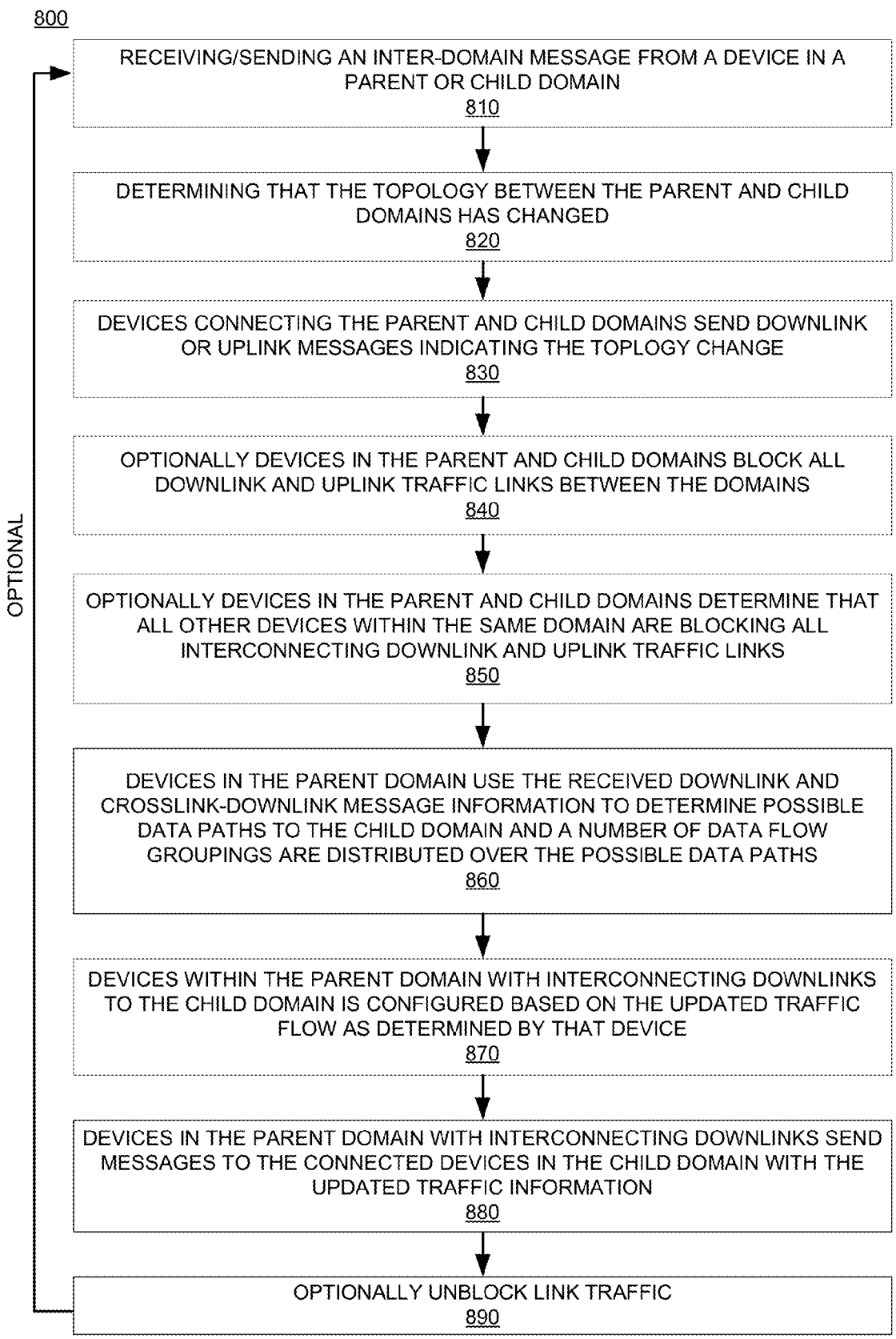
FIG. 8 shows an exemplary block diagram for updating traffic flow within a parent domain and a child domain where the topology change is between the parent and the child domains in accordance with one embodiment.

Referring now to FIG. 8, an exemplary block diagram 800 for updating traffic flow between a parent and child domain where the topology of the interconnection links changes in accordance with one embodiment is shown. At step 810, messages are communicated between devices in the parent and child domains. For example, downlink and uplink messages may be communicated between devices $B_1$ 222 and $D_1$ 242, devices $B_1$ 222 and $D_2$ 244, devices $B_2$ 224 and $D_3$ 246, and devices $B_2$ 224 and $D_4$ 248. It is appreciated that the downlink and uplink messages may be transmitted periodically between devices interconnecting a parent and child domains. It is further appreciated that the downlink and uplink messages may be transmitted in response to a change in topology between the domains.

At step 820, it is determined whether a topology between the parent and child domains has changed. For example, downlink and uplink link information may be updated to indicate that a link up event has occurred and the interconnection link associated with the link up event.

At step 830, devices interconnecting the parent and child domains 220 and 240 send/receive downlink/uplink messages through their associated downlink/uplink connected thereto. For example, downlink messages may be communicated between devices $B_1$ 222 and $D_1$ 242, devices $B_1$ 222 and $D_2$ 244, devices $B_2$ 224 and $D_3$ 246, and devices $B_2$ 224 and $D_4$ 248. Uplink messages may be communicated between devices $D_1$ 242 and $B_1$ 222, devices $D2_1$ 244 and $B_1$ 222, devices $D_3$ 246 and $B_2$ 224, and devices $D_4$ 248 and $B_2$ 224. At optional step 840, devices with an interconnection link between the parent and child domains 220 and 240, may block the interconnection downlink/uplink traffics. Furthermore, at optional step 850, devices, e.g., devices $D_1$ 242, $D_2$ 244, $D_3$ 246, and $D_4$ 248, within the same domain, e.g., domain 240, and devices, e.g., $B_1$ 222, and $B_2$ 224, within the same domain, e.g., domain 220, may determine that devices within the same domain are blocking all downlink/uplink traffics.

At step 860, each device, e.g., devices $B_1$ 222, and $B_2$ 224, in the parent domain e.g., domain 220, may independently determine and update the traffic flow over the interconnection links. The determined traffic flow may be derived from the received downlink and crosslink-downlink information. A number of data flow groups are distributed over the interconnection downlinks that are up (active). It is appreciated that the determination of step 860 may be done in parallel or in sequential manner.

At step 870, devices within the parent domain with interconnecting downlinks to the child domain may be configured with the determined and updated traffic flow independently. At step 880, devices within the parent domain with interconnecting downlinks may send downlink messages to the connected devices in the child domain with the updated traffic flow information. At optional step 890, devices with an interconnection link between the parent and child domains 220 and 240, may unblock the interconnection downlink/uplink traffics that was previously blocked at step 840.

Figure 9:
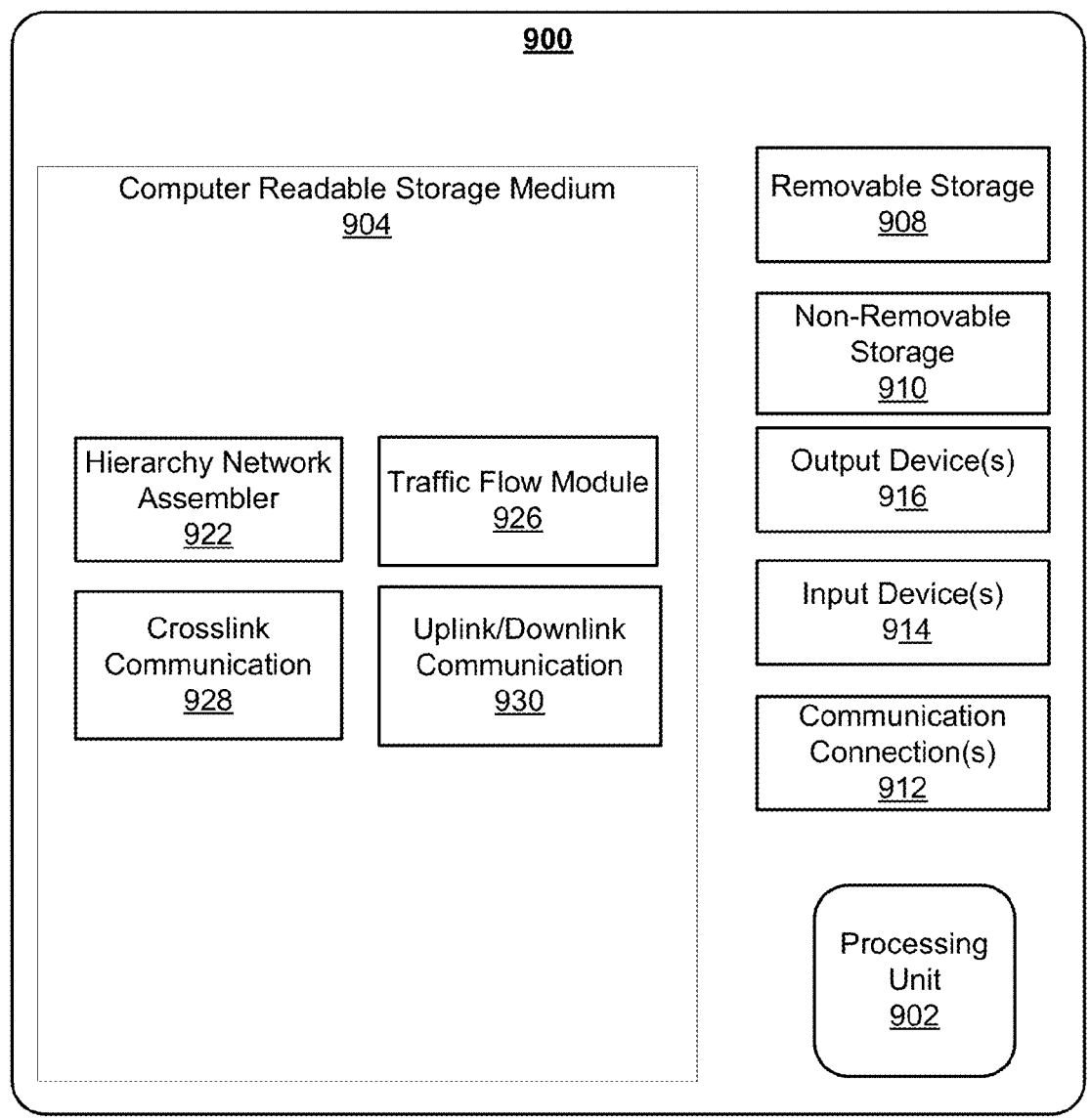
FIG. 9 shows an exemplary computer system in accordance with one embodiment of the present invention.

Referring now to FIG. 9, a block diagram of an exemplary computer system in accordance with one embodiment of the present invention is shown. With reference to FIG. 9, an exemplary system module for implementing embodiments includes a general purpose computing system environment, such as computing system environment 900. Computing system environment 900 may include, but is not limited to, servers, switches, routers, desktop computers, laptops, tablets, mobile devices, and smartphones. In its most basic configuration, computing system environment 900 typically includes at least one processing unit 902 and computer readable storage medium 904. Depending on the exact configuration and type of computing system environment, computer readable storage medium 904 may be volatile (such as RAM), non-volatile (such as ROM, flash memory, etc.) or some combination of the two. Portions of computer readable storage medium 904 when executed facilitate the formation of the hierarchical network structure and communication of protocol messages in order to update traffic flow in response to a change in topology (e.g., processes 500, 600, 700, and 800).

Additionally, in various embodiments, computing system environment 900 may also have other features/functionality. For example, computing system environment 900 may also include additional storage (removable and/or non-removable) including, but not limited to, magnetic or optical disks or tape. Such additional storage is illustrated by removable storage 908 and non-removable storage 910. Computer storage media includes volatile and nonvolatile, removable and non-removable media implemented in any method or technology for storage of information such as computer readable instructions, data structures, program modules or other data. Computer readable medium 904, removable storage 908 and non-removable storage 910 are all examples of computer storage media. Computer storage media includes, but is not limited to, RAM, ROM, EEPROM, flash memory or other memory technology, expandable memory (e.g., USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 900. Any such computer storage media may be part of computing system environment 900.

In some embodiments, computing system environment 900 may also contain communications connection(s) 912 that allow it to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 912 may allow computing system environment 900 to communicate over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 912 connect to may run a plurality of network protocols including, but not limited to, transmission control protocol (TCP), user datagram protocol (UDP), internet protocol (IP), real-time transport protocol (RTP), real-time transport control protocol (RTCP), file transfer protocol (FTP), and hypertext transfer protocol (HTTP).

In further embodiments, computing system environment 900 may also have input device(s) 914 such as keyboard, mouse, a terminal or terminal emulator (either connected or remotely accessible via telnet, SSH, http, SSL, etc.), pen, voice input device, touch input device, remote control, etc. Output device(s) 916 such as a display, a terminal or terminal emulator (either connected or remotely accessible via telnet, SSH, http, SSL, etc.), speakers, light emitting diodes (LEDs), etc. may also be included. All these devices are well known in the art and are not discussed at length.

In one embodiment, computer readable storage medium 904 includes a hierarchy network assembler 922, a traffic flow module 926, a crosslink communication module 928, and an uplink/downlink communication module 930. The hierarchy network assembler module 922 is operable to form a network of hierarchical structure according to flow diagram 500, for instance. The traffic flow module 926 may be used to direct the traffic flow, e.g., forwarding, blocking, etc. The crosslink communication module 928 operates to generate, send and receive crosslink messages to other devices within the same domain, as discussed with respect to flows 500 and 600. The uplink/downlink communication module 930 is operable to generate, send and receive uplink/downlink messages between devices having a parent/child domain relationship, as discussed with respect to flows 700 and 800.

It is appreciated that implementations according to embodiments of the present invention that are described with respect to a computer system are merely exemplary and not intended to limit the scope of the present invention. For example, embodiments of the present invention may be implemented on devices such as switches and routers, which may contain application specific integrated circuits (ASICs), field programmable gate arrays (FPGAs), etc. It is appreciated that these devices may include a computer readable medium for storing instructions for implementing methods according to flow diagrams 500, 600, 700, and 800.

Figure 10:
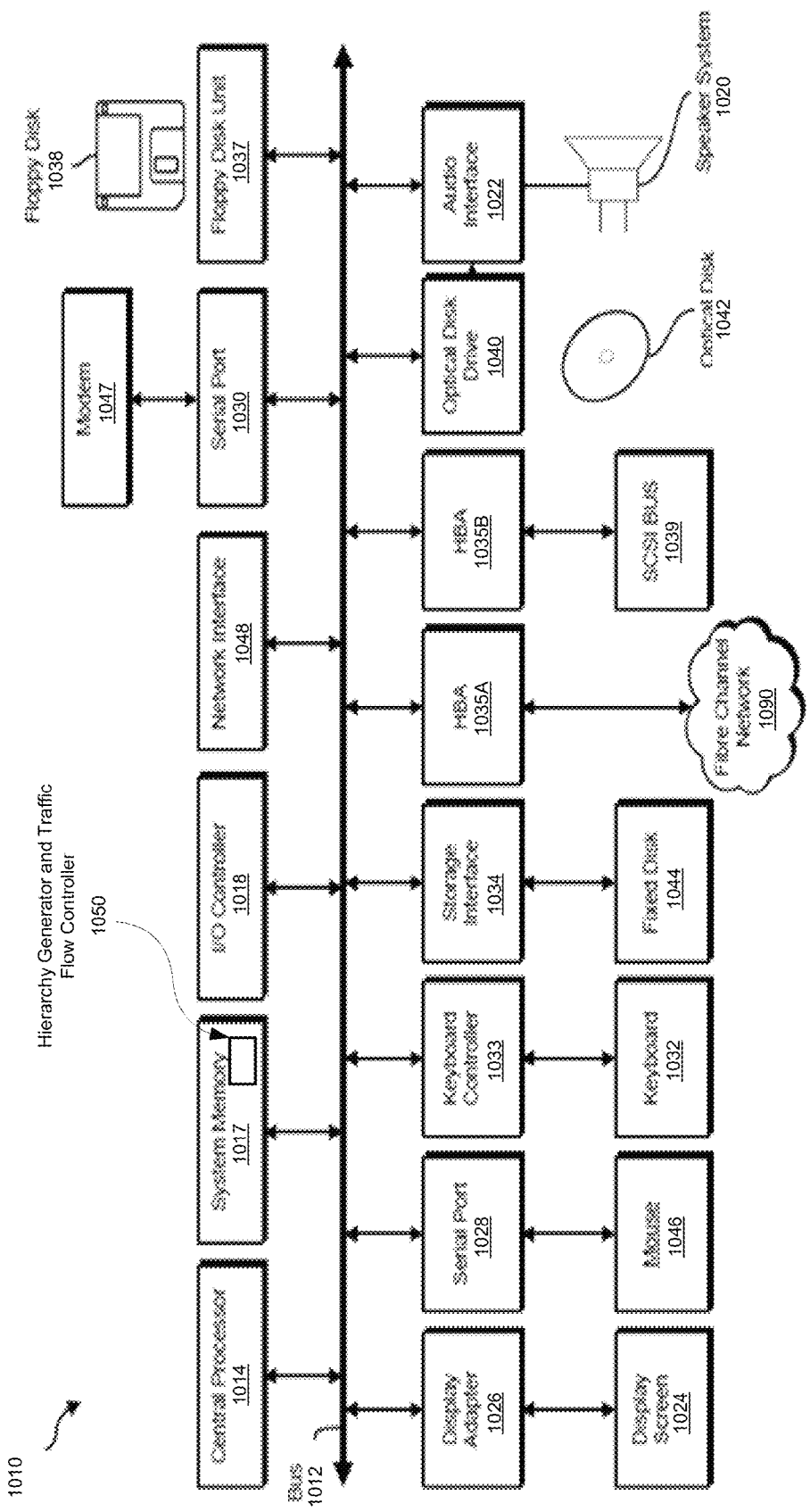
FIG. 10 shows a block diagram of another exemplary computer system in accordance with one embodiment of the present invention.

Referring now to FIG. 10, a block diagram of another exemplary computer system in accordance with one embodiment of the present invention is shown. FIG. 10 depicts a block diagram of a computer system 1010 suitable for implementing the present disclosure. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012). It is appreciated that the network interface 1048 may include one or more Ethernet ports, wireless local area network (WLAN) interfaces, etc., but are not limited thereto. System memory 1017 includes a hierarchy generator and traffic flow module 1050 which is operable to construct a hierarchical network and to further update traffic flows in response to a topology change within the hierarchical network. According to one embodiment, the hierarchical generator and traffic flow module 1050 may include other modules for carrying out various tasks. For example, hierarchy generator and traffic flow module 1050 may include the hierarchy network assembler 922, the traffic flow module 926, the crosslink communication module 928, and the uplink/downlink communication module 930, as discussed with respect to FIG. 9 above. It is appreciated that the traffic flow module 1050 may be located anywhere in the system and is not limited to the system memory 1017. As such, residing of the traffic flow module 1050 within the system memory 1017 is merely exemplary and not intended to limit the scope of the present invention. For example, parts of the traffic flow module 1050 may reside within the central processor 1014 and/or the network interface 1048 but are not limited thereto.

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Network interface 1048 may provide multiple connections to other devices. Furthermore, modem 1047 may provide a direct connection to a remote server via a telephone link or to the Internet via an internet service provider (ISP). Network interface 1048 may provide one or more connection to a data network, which may include any number of networked devices. It is appreciated that the connections via the network interface 1048 may be via a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. The operation of a computer system such as that shown in FIG. 10 is readily known in the art and is not discussed in detail in this application. Code to implement the present disclosure can be stored in computer-readable storage media such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A method comprising:
   forming a core domain in a network, wherein the core domain comprises a device; and
   grouping a plurality of devices to form a plurality of domains within the network, wherein the core domain and the plurality of domains are formed in a hierarchical structure to form at least two data paths between two devices of the network, wherein the core domain is at a top of the hierarchical structure, wherein the at least two data paths carry data between the two devices in absence of a failure associated with a data path of the at least two data paths, and wherein a first data path of the at least two data paths is a redundant data path that carries data between the two devices in response to the failure associated with a second data path of the at least two data paths, and wherein data traffic flow is updated and self contained within only one domain of the plurality of domains in response to the failure and further if the two devices are within the one domain, and wherein data traffic flow is updated in two domains of the plurality of domains in response to the failure and further if the two devices are in two different domains and wherein remainder domains of the plurality of domains remain agnostic to the update to the data traffic flow.

2. The method as described in claim 1, wherein the failure is a link failure.

3. The method as described in claim 1 further comprising:
   in response to a change in a first domain of the network, updating data traffic flow topology in the first domain, wherein domains in the network other than the first domain remain agnostic to the updating.

4. The method as described in claim 3, wherein the change is a change in link status coupling two devices in the first domain, and wherein the updating is in response to a message generated by a device within the first domain.

5. The method as described in claim 1 further comprising:
   in response to a link status change, wherein the link connects a first domain of the network to its child domain, updating data traffic flow topology in the first domain and further in the child domain, wherein the child domain is one hierarchical level further from the core domain in comparison to the first domain, and wherein domains of the network other than the first domain and the child domain remain agnostic to the updating.

6. The method as described in claim 5, wherein the updating occurs in response to a message generated by a device in the parent domain or in the child domain.

7. The method as described in claim 1, wherein any child domain within the network receives data only from one parent domain in the network, wherein a parent domain is one hierarchical level closer to the core domain in comparison to the child domain.

8. The method as described in claim 1 further comprising:
   communicating device information between devices grouped in a same domain, wherein the device information includes information about devices within the same domain and links coupling the devices grouped in the same domain to one another; and communicating domain information between each parent and child domain, and wherein domains within the network other than the each parent and child domains remain agnostic to the domain information, wherein the parent domain is a domain that is only one hierarchical level closer to the core domain in comparison to the child domain.

9. A system comprising:
a core domain in a network, wherein the core domain comprises a device; and
a plurality of domains formed within the network, wherein each domain of the plurality of domains comprises at least one device, wherein the core domain and the plurality of domains are formed in a hierarchical structure to form at least two data paths between two devices in the network, wherein the core domain is at a top of the hierarchical structure, wherein data traffic flow is updated within a domain where a topology change occurs while domains of the network other than the domain where the topology change occurs remain agnostic to the update to the data traffic flow, and wherein data traffic flow is updated in two domains of the plurality of domains in response to the change and further if the two devices are in two different domains and wherein remainder domains of the plurality of domains remain agnostic to the update to the data traffic flow.

10. The system as described in claim 9, wherein the topology change is a change in link status.

11. The system as described in claim 9, wherein a message is generated by a device within the domain where the topology changes, and wherein the message initiates the update, and wherein the message is generated in response to the topology change.

12. The system as described in claim 11, wherein the message includes information associated with the device generating the message and further includes information associated with links coupled to the device generating the message.

13. The system as described in claim 9, wherein devices within a same domain of the network continuously exchange messages, wherein a message transmitted by a transmitting device within the same domain includes information associated with the transmitting device and links coupled thereto.

14. The system as described in claim 9, wherein each device within the domain where the topology changes, updates data traffic flow in parallel and independent of other devices within the domain where the topology changes.

15. A system comprising:
a core domain in a network, wherein the core domain comprises a device; and
a plurality of domains formed within the network, wherein each domain of the plurality of domains comprises at least one device, wherein the core domain and the plurality of domains are formed in a hierarchical structure to form at least two data paths between two devices in the network, wherein the core domain is at a top of the hierarchical structure, wherein data traffic flow is updated within a parent domain and a child domain in response to a change of status associated with a link coupling the parent domain to the child domain while domains of the network other than the parent domain and the child domain remain agnostic to the update to the data traffic flow, wherein the parent domain is one hierarchical level closer to the core domain in comparison to the child domain, and wherein the parent domain and the child domain are within the network.

16. The system as described in claim 15, wherein a message is generated by a device within the parent domain to initiate the update.

17. The system as described in claim 16, wherein the message includes information associated with the parent domain and further includes information associated with data traffic flow on the link.

18. The system as described in claim 15, wherein a message is generated by a device within the child domain to initiate the update.

19. The system as described in claim 18, wherein the message includes information associated with the child domain and further includes information associated with data traffic flow on the link.

20. The system as described in claim 15, wherein messages are generated and exchanged by a device in the parent domain and a device in the child domain that are connected via the link, wherein the messages include information associated with the parent domain and the child domain, and wherein the messages include information associated with data traffic flow on the link, and wherein the link is determined to be a downlink connection in response to determining that the device in the parent domain is one hierarchical level closer to the core domain in comparison to the device in the child domain, wherein the determining is based on the messages.

* * * * *